United States Patent
Majmundar et al.

(10) Patent No.: US 11,171,712 B2
(45) Date of Patent: *Nov. 9, 2021

(54) RADIO LINK CONTROL LAYER BASED RELAYING FOR INTEGRATED ACCESS AND BACKHAUL TRANSMISSIONS IN WIRELESS NETWORKS

(71) Applicant: AT&T Intellectual Property I, L.P., Atlanta, GA (US)

(72) Inventors: Milap Majmundar, Austin, TX (US); Arunabha Ghosh, Austin, TX (US); Thomas Novlan, Cedar Park, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 63 days.

This patent is subject to a terminal disclaimer.

(21) Appl. No.: 16/543,909

(22) Filed: Aug. 19, 2019

(65) Prior Publication Data

US 2019/0372654 A1    Dec. 5, 2019

Related U.S. Application Data

(63) Continuation of application No. 15/868,758, filed on Jan. 11, 2018, now Pat. No. 10,432,295.

(51) Int. Cl.
| | |
|---|---|
| *H04B 7/14* | (2006.01) |
| *H04W 80/02* | (2009.01) |
| *H04W 88/14* | (2009.01) |
| *H04L 12/721* | (2013.01) |
| *H04L 12/803* | (2013.01) |

(Continued)

(52) U.S. Cl.
CPC ..... *H04B 7/15521* (2013.01); *H04B 7/15528* (2013.01); *H04L 45/123* (2013.01); *H04L 47/125* (2013.01); *H04W 40/04* (2013.01); *H04W 40/12* (2013.01); *H04W 40/22* (2013.01); *H04L 2212/00* (2013.01)

(58) Field of Classification Search
None
See application file for complete search history.

(56) References Cited

U.S. PATENT DOCUMENTS

| | | | |
|---|---|---|---|
| 8,259,637 | B2 | 9/2012 | Bertrand et al. |
| 8,670,369 | B2 | 3/2014 | Wang et al. |

(Continued)

FOREIGN PATENT DOCUMENTS

WO    2017/004253 A1    1/2017

OTHER PUBLICATIONS

International Preliminary Report on Patentability received for PCT Application Serial No. PCT/US2018/065810 dated Jul. 23, 2020, 11 pages.

(Continued)

*Primary Examiner* — Duc T Duong
(74) *Attorney, Agent, or Firm* — Amin, Turocy & Watson, LLP

(57) ABSTRACT

Employment of a radio link control (RLC) protocol sublayer, wherein a data packet can be encapsulated by a relay distributed unit according to the protocol based on routing information provided by a routing function component, resulting in an encapsulated data unit. The encapsulated data unit can be transmitted on a relay bearer channel carried on an integrated access and backhaul (JAB) communications link.

20 Claims, 17 Drawing Sheets

(51) Int. Cl.
  *H04B 7/155* (2006.01)
  *H04W 40/22* (2009.01)
  *H04W 40/04* (2009.01)
  *H04W 40/12* (2009.01)

(56) References Cited

U.S. PATENT DOCUMENTS

| | | |
|---|---|---|
| 8,761,073 B2 | 6/2014 | Liu et al. |
| 8,902,833 B2 | 12/2014 | Govindappa et al. |
| 8,971,233 B2 | 3/2015 | Moberg et al. |
| 8,976,806 B2 | 3/2015 | Pasad et al. |
| 9,432,249 B2 | 8/2016 | Fujishiro |
| 2014/0321282 A1 | 10/2014 | Pragada et al. |
| 2016/0337254 A1 | 11/2016 | Karaki et al. |
| 2016/0381665 A1 | 12/2016 | Callard et al. |
| 2017/0012751 A1 | 1/2017 | Leroux et al. |
| 2017/0201352 A1 | 7/2017 | Hessler et al. |
| 2017/0245252 A1 | 8/2017 | Gao et al. |
| 2017/0289882 A1 | 10/2017 | Faccin et al. |
| 2017/0339599 A1 | 11/2017 | Wu |
| 2018/0063014 A1* | 3/2018 | Yu ............... H04W 28/0252 |
| 2018/0077605 A1* | 3/2018 | Maheshwari ....... H04L 69/321 |
| 2019/0044754 A1 | 2/2019 | Hampel et al. |
| 2019/0053301 A1 | 2/2019 | Hampel et al. |
| 2019/0053317 A1 | 2/2019 | Hampel et al. |
| 2019/0098682 A1* | 3/2019 | Park ............... H04W 28/0231 |
| 2019/0132847 A1* | 5/2019 | Abedini ............... H04W 52/28 |
| 2020/0084688 A1* | 3/2020 | Mildh ............... H04L 12/4633 |
| 2020/0389930 A1* | 12/2020 | Park ............... H04W 28/085 |

OTHER PUBLICATIONS

International Search Report and Written Opinion for International Patent Application No. PCT/US2018/065810 dated Mar. 29, 2019, 19 pages.

Huawei et al., "WF on Intergrated Backhaul and Access," 3GPP TSG RAN Wg 1 Meeting #86, RI-168429, Aug. 2016, Gothenburg, Sweden, 6 pages.

Alcatel-Lucent Shanghai Bell et al., "Consideration on uplink rate control for Un interface", 3GPP TSG-RAN WG2 Meeting #70, R2-102876, May 2010, Montreal, Canada, 3 pages.

Huawei et al., "Adaptation layer design", 3GPP TSG-RAN WG3 #Ad Hoc 1807, R3-183784, Jul. 2018, Montreal, Canada, 5 pages.

LG Electronics Inc., "Bearer mapping in IAB Node", 3GPP TSG-RAN2 Meeting AdHoc#1807, R2-1810529, Jul. 2018, Montreal, Canada, 4 pages.

Notice of Allowance received for U.S. Appl. No. 15/868,758 dated May 20, 2019, 24 pages.

* cited by examiner example bearer association table

| UE | UE bearer | 5QI | next hop | relay bearer |
|---|---|---|---|---|
| 1 | 1 | 8 | relay DU A | A1 |
| 1 | 2 | 1 | relay DU A | A2 |
| 2 | 1 | 8 | relay DU A | A1 |
| 3 | 1 | 8 | relay DU B | B1 |
| 4 | 1 | 8 | relay DU B | B1 |
| 4 | 2 | 1 | relay DU B | B2 |
| 4 | 1 | 8 | UE | N/A |
| 4 | 1 | 8 | UE | N/A |

FIG. 11

RADIO LINK CONTROL LAYER BASED RELAYING FOR INTEGRATED ACCESS AND BACKHAUL TRANSMISSIONS IN WIRELESS NETWORKS

RELATED APPLICATION

The subject patent application is a continuation of, and claims priority to, U.S. patent application Ser. No. 15/868,758 (now U.S. Pat. No. 10,432,295), filed Jan. 11, 2018, and entitled "RADIO LINK CONTROL LAYER BASED RELAYING FOR INTEGRATED ACCESS AND BACKHAUL TRANSMISSIONS IN WIRELESS NETWORKS," the entirety of which application is hereby incorporated by reference herein.

TECHNICAL FIELD

The present application relates generally to the field of wireless communication and, more specifically, to radio link control (RLC) layer (e.g., layer-2 based) relaying for integrated access and backhaul (IAB) transmissions in a mobile network.

BACKGROUND

Radio technologies in cellular communications have grown rapidly and evolved since the launch of analog cellular systems in the 1980s, starting from the First Generation (1G) in 1980s, Second Generation (2G) in 1990s, Third Generation (3G) in 2000s, and Fourth Generation (4G) in 2010s (including Long Term Evolution (LTE) and variants of LTE). Fifth generation (5G) access networks, which can also be referred to as New Radio (NR) access networks, are currently being developed and expected to fulfill the demand for exponentially increasing data traffic, and to handle a very wide range of use cases and requirements, including among others mobile broadband (MBB) services, enhanced mobile broadband (eMBB) services and machine type communications (e.g., involving Internet of Things (IOT) devices).

The above-described background relating to wireless networks is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 11 illustrates an example bearer channel association table, in accordance with various aspects and embodiments of the subject disclosure.

DETAILED DESCRIPTION

Figure 1:
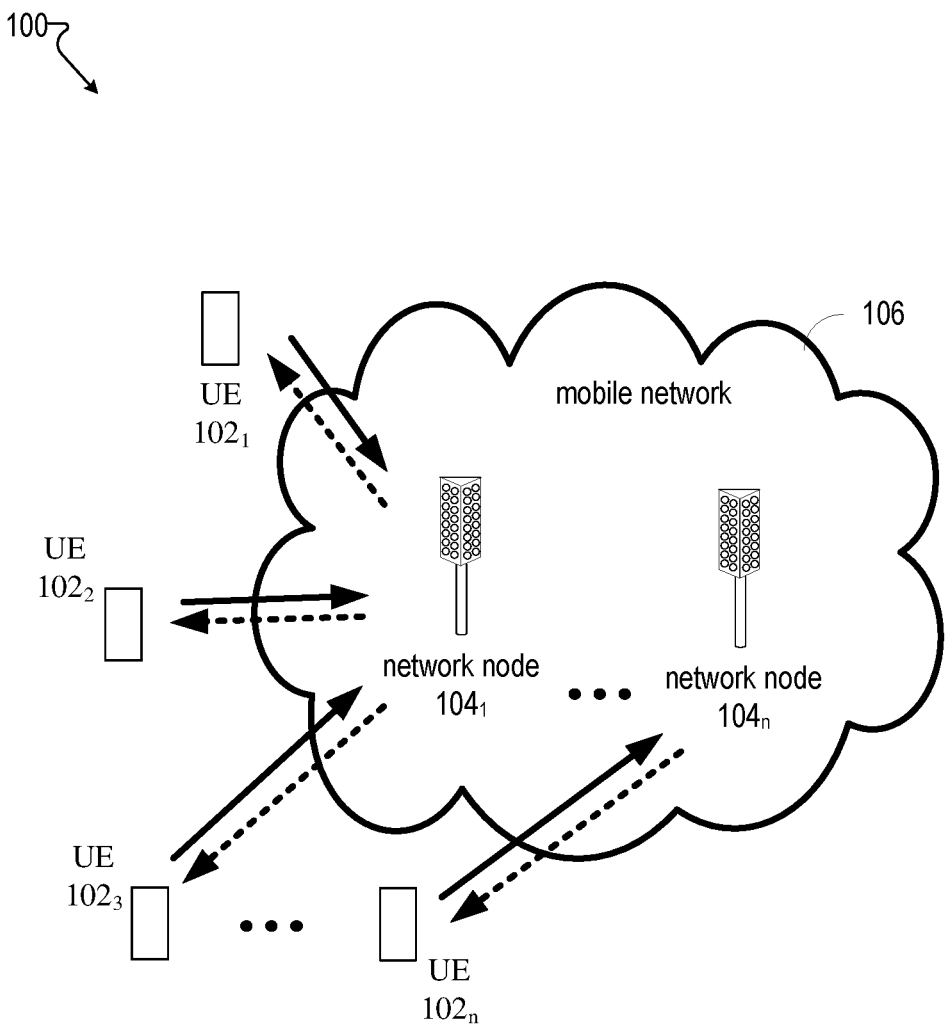
FIG. 1 illustrates an example wireless communication system having a network node device (also referred to herein as a network node) and user equipment (UE) in accordance with various aspects and embodiments of the subject disclosure.

The subject disclosure is now described with reference to the drawings, wherein like reference numerals are used to refer to like elements throughout. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth in order to provide a more thorough understanding of the subject disclosure. It may be evident, however, that the subject disclosure can be practiced without these specific details. In other instances, structures and devices are shown in block diagram form to facilitate describing the subject disclosure.

The methods and operations (e.g., processes and logic flows) described in this specification can be performed by devices (e.g., a relay device, UE, etc.) comprising programmable processors that execute machine executable instructions (e.g., computer program product, computer-readable instructions, software, software programs, software applications, software modules, etc.) to facilitate performance of the operations described herein. Examples of such devices can be devices comprising circuitry and components as described in FIG. 16 and FIG. 17.

The present patent application provides for radio link control (RLC) layer based relaying of integrated access and backhaul (IAB) traffic in a mobile communications system (e.g., a 5G NR radio network architecture), such that the relaying is transparent to upper protocol layers of the RAN, the core network, and the UE. In this regard, the present application provides for system and methods for performing layer-2 based relaying for IAB communications, which can be implemented, for example, in 5G NR networks. More specifically, there is provided systems and methods for the implementation of a radio link control (RLC) layer based relaying of IAB traffic employable, for example, in a 5G NR radio network architecture, such that the relaying is transparent to upper protocol layers of the RAN, the core network, and the user equipment (UE). The protocol sublayer can reside at or above the RLC layer in the data plane protocol stack at the DU, and can direct, or be responsible for, RLC encapsulation, tunneling and routing (RETR), wherein a protocol data packet (PDU) can be encapsulated by a PDU encapsulation and tunneling function according to the protocol sublayer based on routing information provided by a routing function of the RETR sublayer. The routing function can provide routing information to the PDU encapsulation and tunneling function regarding which UE bearers are encapsulated and tunneled into which IAB relay bearers. Thus, PDUs from multiple bearers corresponding to different UEs can be encapsulated and multiplexed for relaying over IAB relay bearers to a relay distributed unit (DU). Encapsulated PDUs can be transmitted on a relay bearer channel carried on an integrated access and backhaul (IAB) communications link.

The use of the RETR protocol layer to increase utilization of backhaul links can allow for ultra-dense deployment of mmWave transmission points (TPs) without having to increase the number of wired transport nodes and connections proportionately, which can allow for increased efficiency and scalability. Additionally, due to the usage of phased array transmissions, access and backhaul links can use the same radio (unlike cellular bands, which would require separate radios), and as such, operation in duplex mode would not be required. Additionally, the system and methods herein can allow for faster and more efficient route switching, which can mitigate blocking in mmWave transmissions. The present systems and methods can also allow for multi-hop scheduling and route optimization.

FIG. 1 illustrates an example wireless communication system 100 (also referred to as wireless system 100, mobile system 100, mobile communications system 100) in accordance with various aspects and embodiments of the subject disclosure. In example embodiments (also referred to as non-limiting embodiments), wireless communications system 100 can comprise a mobile (also referred to as cellular) network 106, which can comprise one or more mobile networks typically operated by communication service providers. The wireless communication system 100 can also comprise one or more user equipment (UE) $102_{1-n}$ (also referred to as UE 102). UE $102_{1-n}$ can communicate with one another via one or more network node devices (also referred to as network nodes) $104_{1-n}$ (referred to as network node 104 in the singular) of the mobile network 106. The dashed arrow lines from the network nodes $104_{1-n}$ to the UE $102_{1-n}$ represent downlink (DL) communications and the solid arrow lines from the UE $102_{1-n}$ to the network nodes $104_{1-n}$ represent uplink (UL) communications.

UE 102 can comprise, for example, any type of device that can communicate with mobile network 106, as well as other networks (see below). The UE 102 can have one or more antenna panels having vertical and horizontal elements. Examples of a UE 102 comprise a target device, device to device (D2D) UE, machine type UE, or UE capable of machine to machine (M2M) communications, personal digital assistant (PDA), tablet, mobile terminal, smart phone, laptop mounted equipment (LME), universal serial bus (USB) dongles enabled for mobile communications, a computer having mobile capabilities, a mobile device such as cellular phone, a dual mode mobile handset, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. UE 102 can also comprise IOT devices that communicate wirelessly.

Mobile network 106 can include various types of disparate networks implementing various transmission protocols, including but not limited to cellular networks, femto networks, picocell networks, microcell networks, internet protocol (IP) networks, Wi-Fi networks associated with the mobile network (e.g., a Wi-Fi "hotspot" implemented by a mobile handset), and the like. For example, in at least one implementation, wireless communications system 100 can be or can include a large scale wireless communication network that spans various geographic areas, and comprise various additional devices and components (e.g., additional network devices, additional UEs, network server devices, etc.).

Still referring to FIG. 1, mobile network 106 can employ various cellular systems, technologies, and modulation schemes to facilitate wireless radio communications between devices (e.g., the UE 102 and the network node 104). While example embodiments might be described for 5G New Radio (NR) systems, the embodiments can be applicable to any radio access technology (RAT) or multi-RAT system where the UE operates using multiple carriers. For example, wireless communications system 100 can be of any variety, and operate in accordance with standards, protocols (also referred to as schemes), and network architectures, including but not limited to: global system for mobile communications (GSM), 3GSM, GSM Enhanced Data Rates for Global Evolution (GSM EDGE) radio access network (GERAN), Universal Mobile Telecommunications Service (UMTS), General Packet Radio Service (GPRS), Evolution-Data Optimized (EV-DO), Digital Enhanced Cordless Telecommunications (DECT), Digital AMPS (IS-136/TDMA), Integrated Digital Enhanced Network (iDEN), Long Term Evolution (LTE), LTE Frequency Division Duplexing (LTE FDD), LTE time division duplexing (LTE TDD), Time Division LTE (TD-LTE), LTE Advanced (LTE-A), Time Division LTE Advanced (TD-LTE-A), Advanced eXtended Global Platform (AXGP), High Speed Packet Access (HSPA), Code Division Multiple Access (CDMA), Wideband CDMA (WCMDA), CDMA2000, Time Division Multiple Access (TDMA), Frequency Division Multiple Access (FDMA), Multi-carrier Code Division Multiple Access (MC-CDMA), Single-carrier Code Division Multiple Access (SC-CDMA), Single-carrier FDMA (SC-FDMA), Orthogonal Frequency Division Multiplexing (OFDM), Discrete Fourier Transform Spread OFDM (DFT-spread OFDM), Single Carrier FDMA (SC-FDMA), Filter Bank Based Multi-carrier (FBMC), zero tail DFT-spread-OFDM (ZT DFT-s-OFDM), Unique Word OFDM (UW-OFDM), Unique Word DFT-spread OFDM (UW DFT-Spread-OFDM), Cyclic Prefix OFDM (CP-OFDM), resource-block-filtered OFDM, Generalized Frequency Division Multiplexing (GFDM), Fixed-mobile Convergence (FMC), Universal Fixed-mobile Convergence (UFMC), Multi Radio Bearers (RAB), Wi-Fi, Worldwide Interoperability for Microwave Access (WiMax), and the like.

Still referring to FIG. 1, in example embodiments, UE 102 can be communicatively coupled (or in other words, connected) to a network node 104 of the mobile network 106. Network node 104 can have a cabinet and other protected enclosures, an antenna mast, and multiple antennas for performing various transmission operations (e.g., MIMO operations). Each network node 104 can serve several cells, also called sectors, depending on the configuration and type of antenna. Network node 104 can comprise NodeB devices, base station (BS) devices, mobile stations, access point (AP) devices, and radio access network (RAN) devices. Network node 104 can also include multi-standard radio (MSR) radio node devices, including but not limited to: an MSR BS, an eNode B device (e.g., evolved NodeB), a network controller, a radio network controller (RNC), a base station controller (BSC), a relay device, a base transceiver station (BTS), an access point, a transmission point (TP), a transmission/receive point (TRP), a transmission node, a remote radio unit (RRU), a remote radio head (RRH), nodes in distributed antenna system (DAS), and the like. In 5G terminology, the network node is referred to by some as a gNodeB device.

Still referring to FIG. 1, in various embodiments, mobile network 106 can be configured to provide and employ 5G cellular networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

Still referring to FIG. 1, to meet the demand for data centric applications, features of proposed 5G networks may comprise: increased peak bit rate (e.g., 20 Gbps), larger data volume per unit area (e.g., high system spectral efficiency— for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 Gbps to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Figure 2:
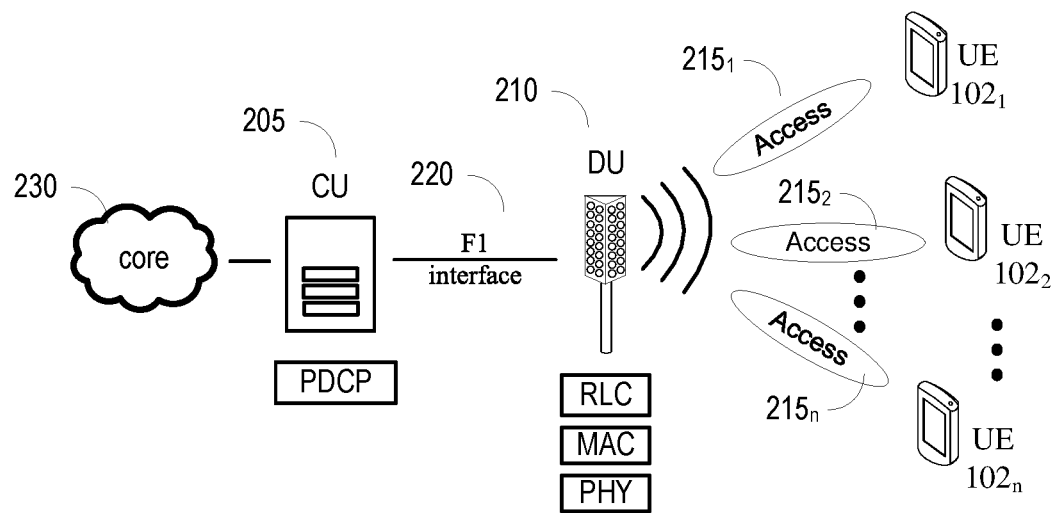
FIG. 2 illustrates an example wireless communication system having a split radio access network (RAN) architecture, in accordance with various aspects and embodiments of the subject disclosure.

FIG. 2 illustrates an example embodiment of a mobile network (e.g., wireless communications system 100) that employs a split RAN protocol architecture. In this architecture (also referred to as a cloud RAN architecture), non-real-time control functions are centrally hosted (e.g., in a central unit (CU) 205) to direct transmissions across coverage areas, while real time functions are deployed at an antenna site (e.g., a distributed unit (DU) 210 at the site) that manages air interface resources between the antenna site and UEs (e.g., UE $102_{1-n}$). This architecture is native to the 3GPP specification, and can be expected to be employed in the upcoming 5G RAN network. In a split RAN protocol architecture, some of the various functionality of a network node (e.g., network node 104) can be split and implemented in distributed devices, as will be described below. The upcoming 5G access network can also employ an architecture in which a user plane and control plane are separate, wherein complex control plane functions are abstracted from forwarding elements, simplifying user plane operations by relocating control logic to physical or virtual servers. Each plane carries a different type of traffic and can be implemented as overlay networks that runs independently on top of another one, although supported by its infrastructure. The user plane (sometimes known as the data plane, forwarding plane, carrier plane, or bearer plane) carries the network user traffic, and the control plane carries signaling traffic. In example embodiments, the planes can be implemented in the firmware of routers and switches.

In the example split RAN protocol architecture shown in FIG. 2, on the user plane, the Packet Data Convergence Protocol (PDCP) sublayers can reside at the CU 205, while the radio link control (RLC), media access control (MAC), and PHY layers can reside at the DU 210, wherein the DU, in example embodiments can comprise a relay device (a.k.a., relay, relay node (RN), relay transmission point (rTP)). As is known in the art, the PDCP layer, part of LTE layer 2 protocols, can responsible for compression of the IP header of user-plane data packets (e.g., using the robust header compression (RoHC) protocol) to reduce the number of bits transmitting over the radio interface, ciphering and integrity protection of RRC messages, in-sequence delivery and retransmission of PDCP service data units (SDUs), and duplicate detection. The RLC layer is responsible for segmentation, concatenation, ARQ retransmission (e.g., error correction through automatic repeat request (ARQ)) and in-sequence delivery to higher layers. The media access control MAC layer is responsible for multiplexing of RLC protocol data units, HARQ retransmission (e.g., error correction through HARQ), scheduling for uplink and downlink, logical channel prioritization. The physical layer (PHY) layer is responsible for coding/decoding, modulation/demodulation, multi-antenna processing, and mapping of signals to the appropriate physical time-frequency resources. Mapping of transport channels to physical channels is also handled at the PHY layer.

User plane data is carried on data radio bearers (DRBs) that traverse the above described user plane RAN protocol architecture. On the control plane, signaling radio bearers (SRBs) are set up that carry control messages from the RRC layer also utilize the PDCP layer at the CU, and are further carried down through the RLC, MAC, and PHY layers at the DU to be delivered to the UE (e.g., UE 102) via access link 215 (also referred to as 215$_{1-n}$) over the air interface. Each network UE 102 can be allocated multiple DRBs and SRBs by the network. The network interface (e.g., communications interface) between the CU 205 and DU 210 can be referred to as the F1 (or F1-U) interface 220 (e.g., per 3GPP specifications).

The CU 205 can be operable to communicate with a core 230 (e.g., evolved packet core (EPC)), via for example, a fiber interface. The core can serve as the interface for connection to networks such as the internet, corporate private networks, IP multimedia subsystems, etc. (e.g., one or more communication service provider networks).

Figure 3:
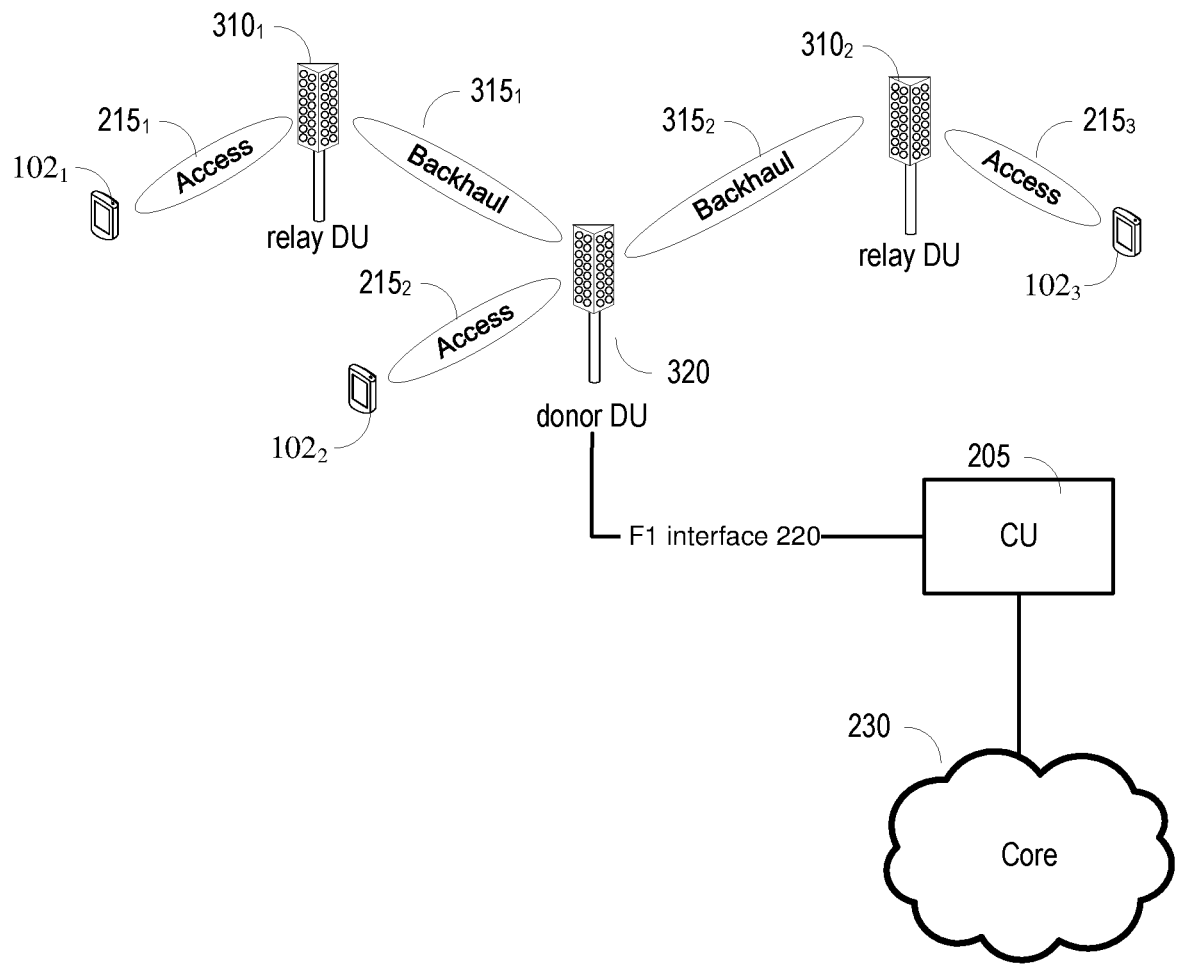
FIG. 3 illustrates an example wireless communication system having a split radio access network architecture, wherein a donor distributed unit (DU) can communicate via other DUs via backhaul links, and with UEs via access links, in accordance with various aspects and embodiments of the subject disclosure.

FIG. 3 illustrates of an example embodiment of a network (e.g., wireless communications system 100) that employs a split RAN protocol architecture utilizing more than one DU, wherein the DUs can use an integrated access and backhaul (IAB) link to communicate between each other and with UEs. Due to the expected larger bandwidth available for NR compared to LTE (e.g. mmWave spectrum) along with the native deployment of massive MIMO or multi-beam systems in NR, there is now an opportunity to develop and deploy IAB links. This may allow easier deployment of a dense network of self-backhauled NR cells in a more integrated manner by building upon many of the control and data channels/procedures defined for providing access to UEs.

FIG. 3 shows two example relay DUs (relay DU 310$_1$, and relay DU 310$_2$). Relay DUs can be located at the edge of a network node 104's cell, and can aid in meeting the ever-increasing demand for coverage and capacity. In example embodiments, a relay DU is typically smaller in size than a network node (e.g., network node 104), has lower power consumption, and can connect via a backhaul link (e.g., shown as backhaul link 315$_1$ and 315$_2$, also referred to as backhaul links 315$_{1-n}$ in the plural) to another DU, which can be referred to as a donor DU (e.g., donor DU 320). As an example, a UE (e.g., UE 102$_1$ as shown in FIG. 3) can transmit a signal via a wireless access communications link (e.g., access link 215$_1$) to relay DU 310$_1$, which can then relay the signal via a backhaul link (e.g., backhaul link 315$_1$) to the donor DU 320. In some instances, a donor DU 320 can communicate between a relay DU, and also communicate with one or more UEs. For example, donor DU 320 can communicate with relay DU 310$_1$ and relay DU 310$_2$, and also communicate with UE 102$_2$, for example, using multiplexing and multiple access schemes.

In the example embodiments of the present application, the backhaul communications between donor units (e.g., between donor DU 320 and relay DU 310$_1$) and the access communications between user equipment (UE) and donor units (e.g., between donor DU 320 and UE 102$_2$), can be integrated, resulting in an integrated access and backhaul (IAB) link. For example, these communications can be multiplexed in the scheduler of an DU, wherein the scheduler can be operable to determine resource assignments for transmissions between UEs and DUs, and between the donor DU and the relay DU. Typically, schedulers will assign resources based upon numerous criteria (e.g., base station throughput, user latency, fairness, etc.). Depending on factors and conditions (e.g., condition of the channels, number of DUs, number of UEs in a cell, etc.), the schedulers of the DUs can be operative to select from a variety of multiplexing schemes that can integrate the transmission of the backhaul links and access links. For example, referring to FIG. 3, donor DU can be sending to and receiving signals from both UE 102$_2$ and from relay DU 310$_1$. The transmissions can be multiplexed so as to avoid interference. Some example transmission schemes integrating access and backhaul transmissions are described further in FIG. 4.

Figure 4:
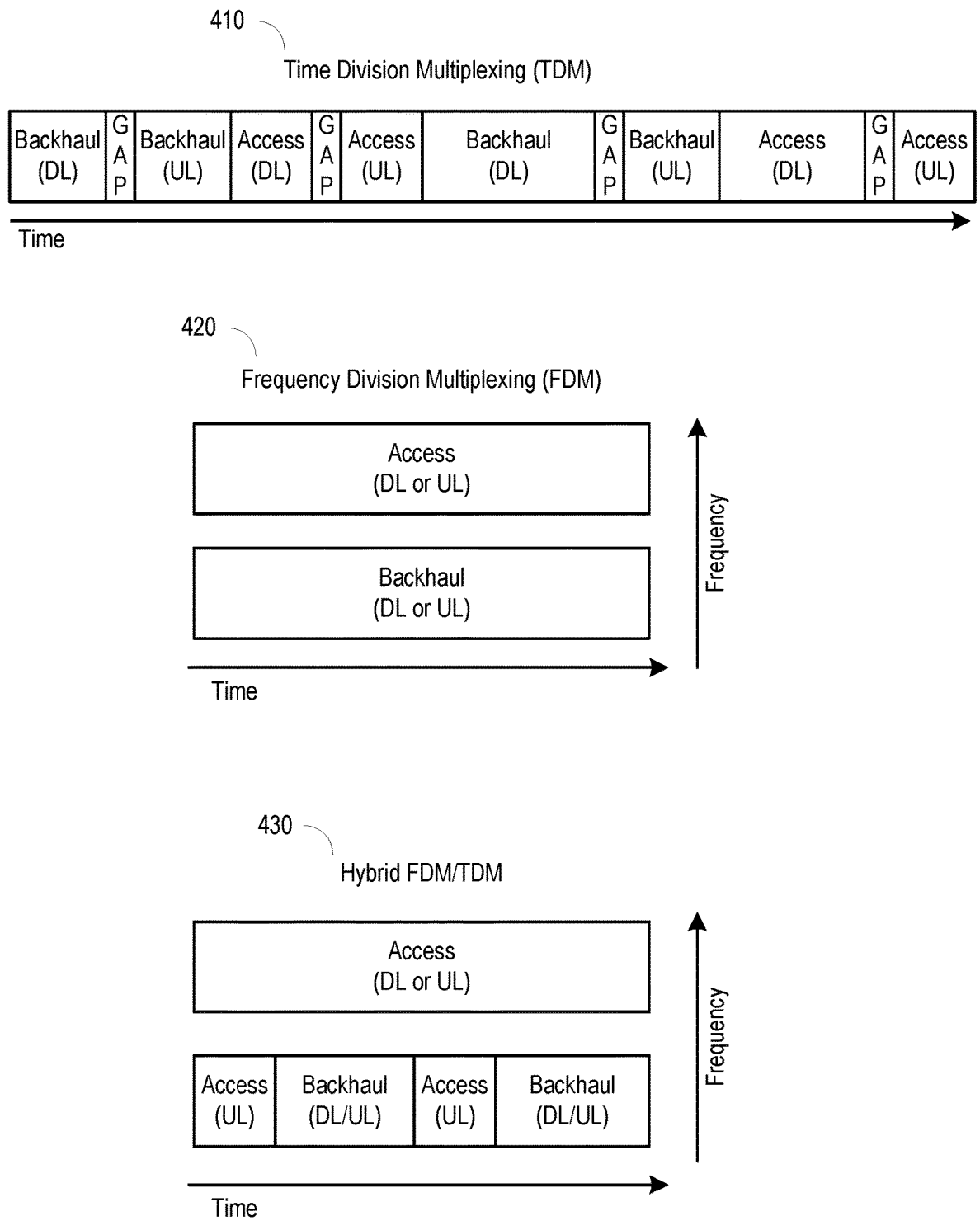
FIG. 4 illustrates examples of multiplexing schemes for integrating access and backhaul transmissions, in accordance with various aspects and embodiments of the subject disclosure.

FIG. 4 shows examples of transmissions employing time division multiplexing (TDM) 410, frequency division multiplexing (FDM) 420, and hybrid FDM/TDM 430 to integrate backhaul (in-band or out of band) and access link transmissions. In the example transaction illustrating TDM 410, backhaul downlink (e.g., Backhaul DL), backhaul uplink (e.g., Backhaul UL), access downlink (e.g., Access DL), and access uplink (e.g., Access UL) transmissions can occur at different times on the same frequency (guard intervals in between transmission slots can also be employed). Frequency division multiplexing (FDM) 420 schemes can also be employed whereby uplink and downlink transmissions on the access link are made on one frequency, and uplink and downlink transmission on the backhaul link are made on another frequency, thereby allowing the transmissions to occur at the same time. Still referring to FIG. 4, in the example illustrating hybrid FDM/TDM 430, uplink and downlink access transmissions can be transmitted on one frequency, while other access and backhaul uplink and downlink transmissions with assigned time slots are transmitted on another frequency. While not shown in FIG. 4, in addition to time and frequency, the transmissions can also be multiplexed in space. Beamforming and directional transmissions can allow for transmissions in the same frequency and time, but directed spatially in a different direction or magnitude, so as to reduce interference.

Figure 5:
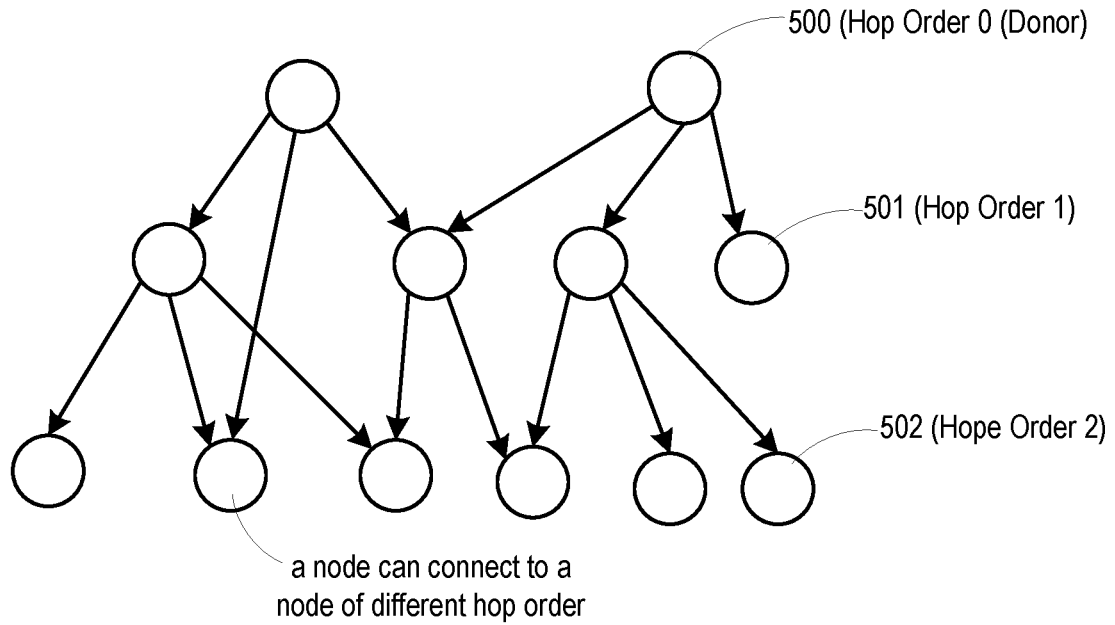
FIG. 5 illustrates a tree diagram depicting an example of nodes having different hop orders, in accordance with various aspects and embodiments of the subject disclosure.

Referring now to FIG. 5, example embodiments of the present application can provide for multi-hop backhauling and multi-site connectivity. That is, the integration of backhaul link and access link transmissions can take into account hop order. The hop order (e.g., node order) can indicates the number of hops it is away from a donor DU. FIG. 5 shows the topology of a portion of a network employing donor DUs and relay DUs. As a relational graph based on edges and nodes, wherein each circle represents a relay DU, or a donor DU. In FIG. 5, node 500 can comprise a donor DU, node 501 can comprise a relay DU with a hop order of 1 (e.g., one hop away from node 500), and node 502 is a relay node of hop order 2 (e.g., 2 hops away from node 500). Thus, a DU can have more one or more DUs between it and a donor DU, and each donor DU can connect to multiple DUs of different hop orders.

Figure 6:
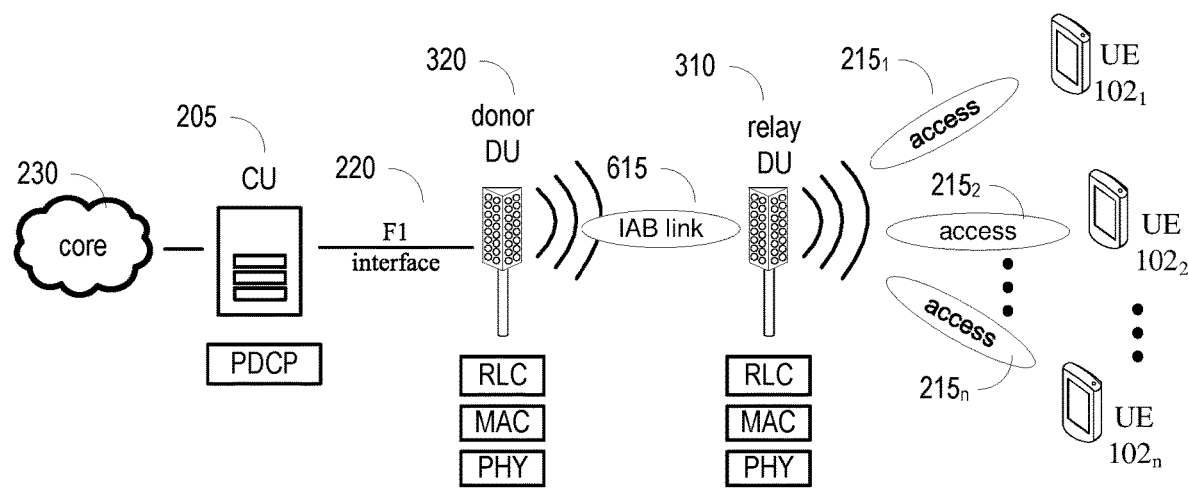
FIG. 6 illustrates an example wireless communication system having a split RAN architecture and an integrated access and backhaul (IAB) link, in accordance with various aspects and embodiments of the subject disclosure.

FIG. 6 shows another example illustration wherein the multiplexed access and backhaul transmissions are represented with IAB link 615, wherein a DU (e.g., donor DU 320, relay DU 310) can multiplex data via access and backhaul links in time, frequency, or space (e.g. beam-based operation), as described above in FIG. 4. The IAB link 615 between the donor DU 320 and the relay DU 310 can carry user plane and control plane data for all the UEs $102_{1-n}$ being served by the relay DU 310. Hence, the relay link multiplexes packets for/from multiple different bearers serving the UEs $102_{1-n}$ that are being served by the relay DU 310.

In accordance with various aspects and embodiments of the subject disclosure, there is provided a system and method for performing encapsulation and tunneling of bearers from multiple DUs into relay bearers that carry the tunneled UE traffic from/to the donor CU to/from relay DU(s) on the downlink/uplink, respectively. In accordance with various aspects and embodiments of the subject disclosure, a data plane protocol stack sublayer can be implemented at the donor DU (e.g., donor DU 320) and relay DUs (e.g., relay DU 310) in order to enable IAB links (e.g., IAB link 615) that are transparent to the core 230, the CU 205, and the UE 102. In other words, the data plane protocol stacks at the core 230, CU 205, F1 interface 220, and UE 102 need not be aware that there is any relaying being implemented in the network.

Figure 7:
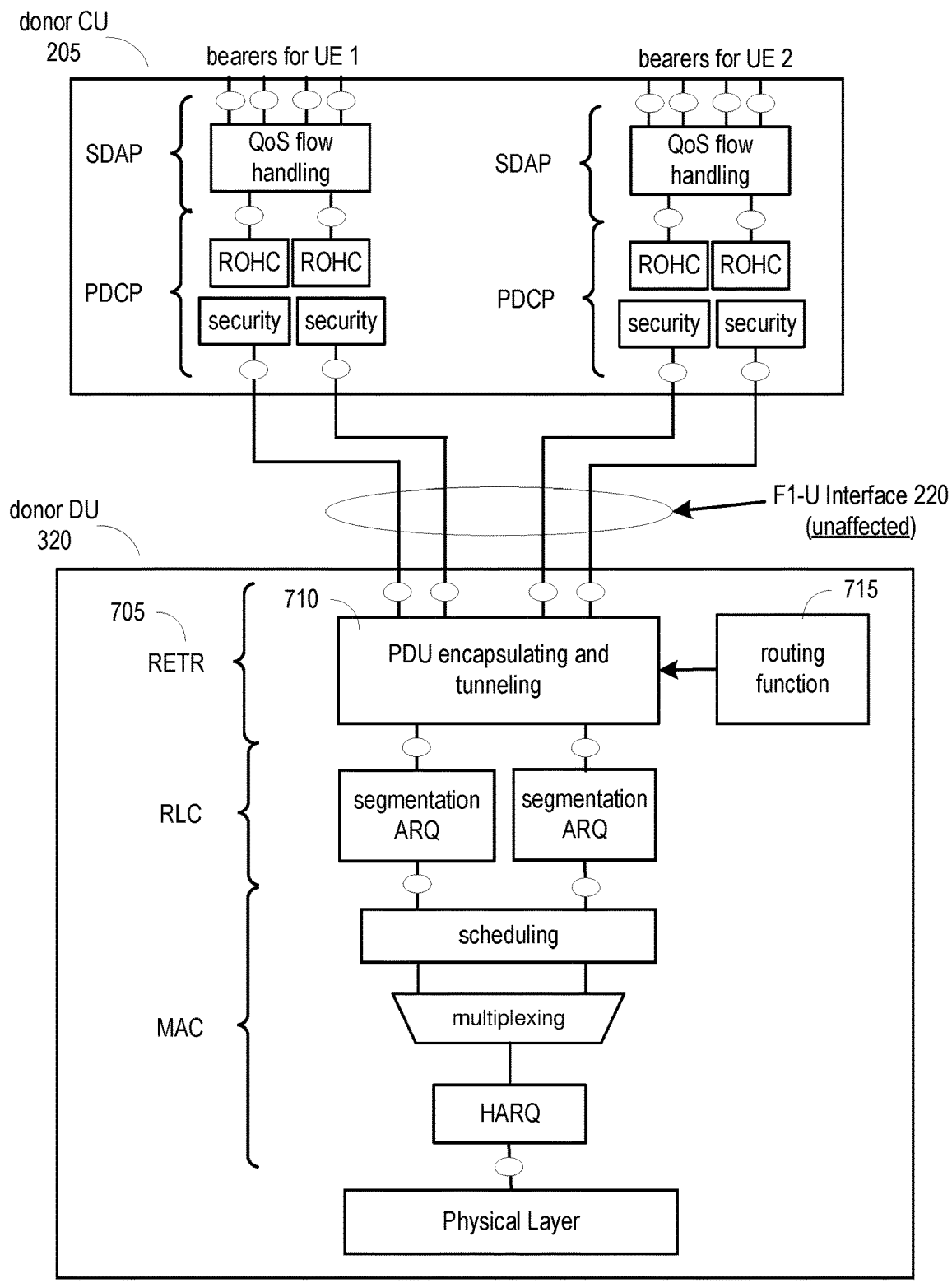
FIG. 7 illustrates an example of a radio link control (RLC) encapsulation, tunneling and routing (RETR) sublayer, in accordance with various aspects and embodiments of the subject disclosure.

FIG. 7 illustrates an example block diagram showing a RLC encapsulation, tunneling and routing (RETR) sublayer 705 that can be responsible for encapsulation and tunneling of bearers from multiple DUs into relay bearers. Referring to FIG. 7, the RETR sublayer 705 can reside at or above the RLC layer in the data plane protocol stack of a donor DU (e.g., donor DU 320). The northbound service access points (SAPs) of the RETR sublayer 705, which point towards the PDCP layer of the CU 205 (also referred to herein as donor CU), remains identical to those offered by the RLC sublayer prior to the implementation of the RETR sublayer 705. Hence, the PDCP layer can be unaware of the existence of RETR functionality to support IAB, providing transparency in transport. Additionally, due to the lack of impact on the PDCP user plane, the F1-U interface 220 between the PDCP and RLC also remains unaffected due to the implementation of the RETR sublayer 705 at the donor DU 320.

In example embodiments in accordance with various aspects of the subject disclosure the RETR sublayer 705 (also referred to herein as RETR protocol sublayer 705) can comprise of a protocol data unit (PDU) encapsulation and tunneling function, represented by block 710, and a routing function, represented by block 715 in FIG. 7. Theses functions can be components that are implementable by hardware, software, or a combination of both. With respect to the PDU encapsulation and tunneling function 710, PDCP PDU from multiple bearers belonging to different UEs are encapsulated into IAB PDUs for relaying over the IAB relay bearers destined to a relay DU (e.g., relay DU 310). This function operates on the user plane protocol PDU (PDCP PDUs) for each bearer received over the F1 interface (also referred to as the F1-U interface) from the PDCP sublayer at the donor CU 205.

The routing function 715 of the RETR sublayer 705 at the DU provides input (e.g., routing information) to the RETR encapsulation and tunneling function 710, for example regarding which UE bearers are encapsulated and tunneled into which IAB relay bearers based on the established routing path from the donor CU via relay DUs to the UE.

Still referring to FIG. 7, regarding the RETR sublayer 705, for a non-IAB deployment, the RETR sublayer 705 of a DU would be in a pass-through mode such that the PDCP PDUs for bearers received over the F1-U interface are passed through untreated (e.g., un-encapsulated by the PDU encapsulation and tunneling function 710) to the corresponding RLC layer for the particular bearer.

For scenarios where the donor DU (e.g., donor DU 320) serves as the access relay DU for some UEs (e.g., UE 102), while simultaneously serving as the donor DU for some UEs connected to downstream relay DUs (e.g., relay DU 310), the routing function can provide information (e.g., routing information) to the PDU encapsulating and tunneling function regarding which bearers to bundle into IAB relay bearers, and which bearers to treat in a pass-through mode. Thus, the relay device can be operable to determine whether to encapsulate the PDCP PDU according to a RETR sublayer 705 protocol.

When a donor DU serves multiple relay DUs (meaning it serves different sets of paths to different sets of UEs), for example as shown in FIG. 3, there may be many different sets of IAB relay bearers corresponding to each relay DU, and the routing function can guide the encapsulation and tunneling function as described above.

The RETR may choose the UE bearers to be encapsulated into a relay bearer based on different criteria, including, but not limited to, required quality of service (QoS) treatment, RLC mode (acknowledged mode (AM), unacknowledged mode (UM), and transparent mode (TM)), the number of hybrid automatic repeat request (HARQ) retransmissions, and other related parameters such as relay bearer initial block error rate (iBLER) target, etc.

Figure 8A:
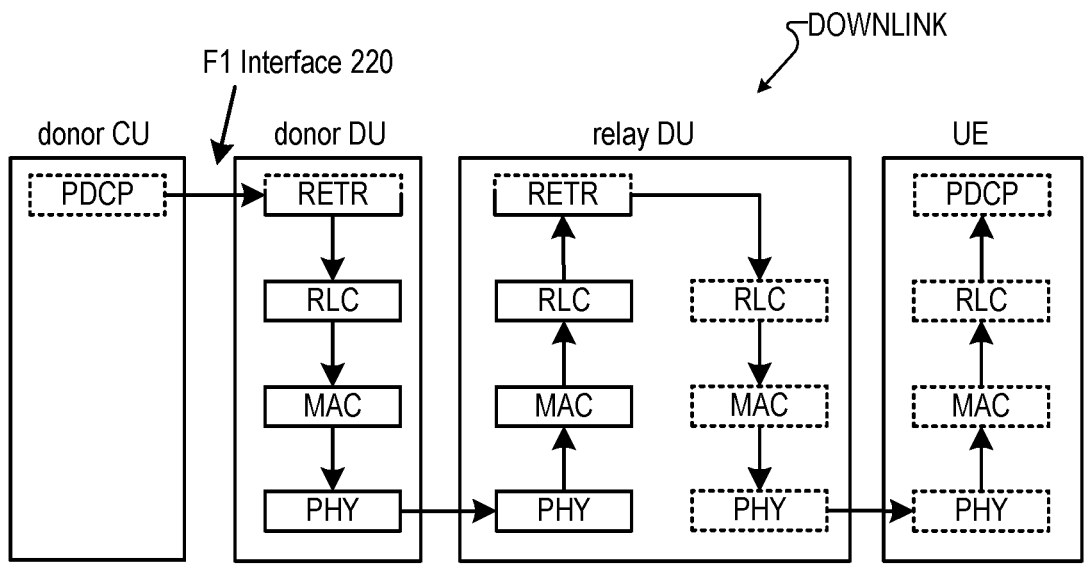
FIGS. 8A and 8B illustrate protocol sublayer user plane protocol stack diagrams showing the RETR and its interaction with the different protocol layers, in accordance with various aspects and embodiments of the subject disclosure.
Figure 8B:
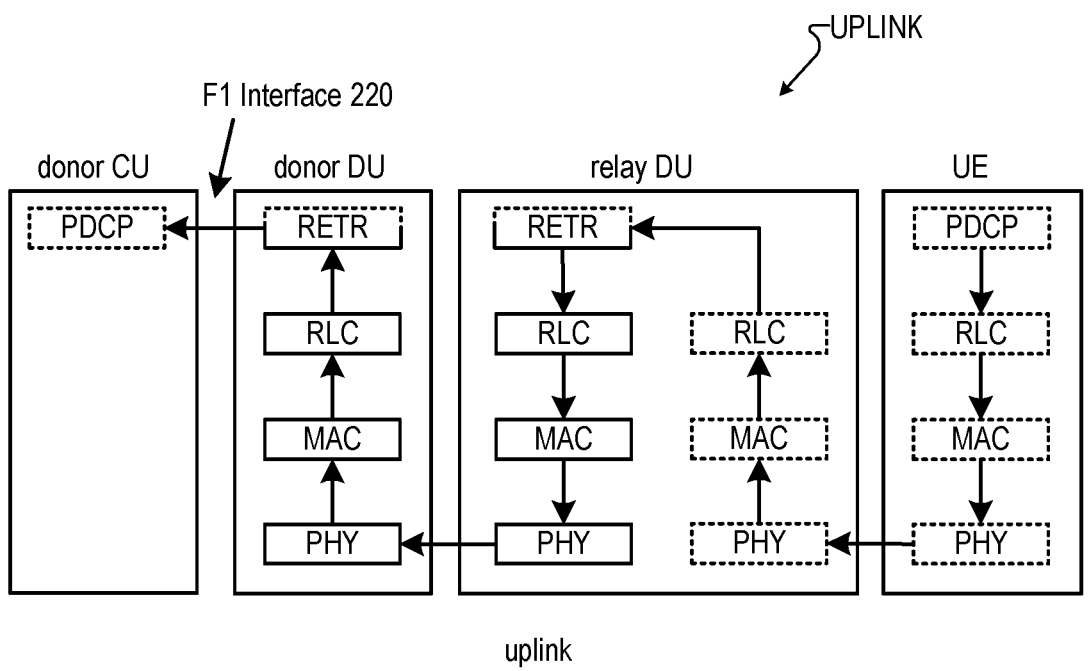

FIGS. 8A and 8B provide example illustrations at a high level, of the operation of the PDU encapsulation and tunneling function 710 in the user plane protocol stacks for the downlink (FIG. 8A) and uplink (FIG. 8B), in accordance with various aspects and embodiments of the subject disclosure. In FIG. 8, the protocol sublayers shown in dotted lines operate at the UE bearer level, whereas the protocol stack sublayers indicated with solid lines operate at the relay bearer level. The RETR sublayer performs the translation between the UE and RETR bearer levels (hence, its block is shown with a mix of dotted and solid lines). On the downlink, when the UE is being served by the relay DU, the RETR sublayer at the relay DU performs de-capsulation of PDCP PDU received over the relay tunnel, and passes them down to the RLC SAP corresponding to the UE bearer for transmission over the air interface (the air interface can also be referred to with the designation Uu).

In instances in which the UE is served by a second relay (e.g., two relay hop case), the RETR sublayer at the first relay DU will first de-capsulate the PDCP PDUs received over the first relay tunnel, and again perform an encapsulation and tunneling into a second relay bearer for transmission to the second relay. The routing function of the RETR sublayer at the first relay DU can decide the manner in which the second encapsulation and tunneling into a second relay bearer is performed. This can be further extended to multi-hop relaying (across more than two hops), where the de-capsulation/encapsulation for the subsequent hop is performed by the relay DU of the previous hop order.

Figure 9A:
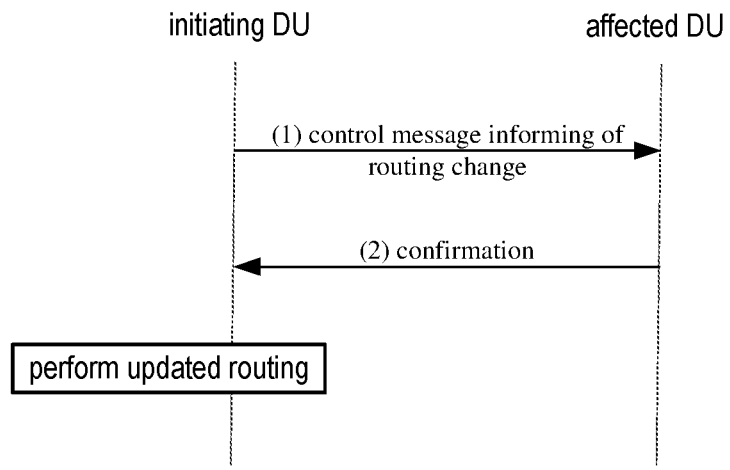
FIGS. 9A and 9B illustrate message sequence diagrams related to performing a routing function update, in accordance with various aspects and embodiments of the subject disclosure.
Figure 9B:
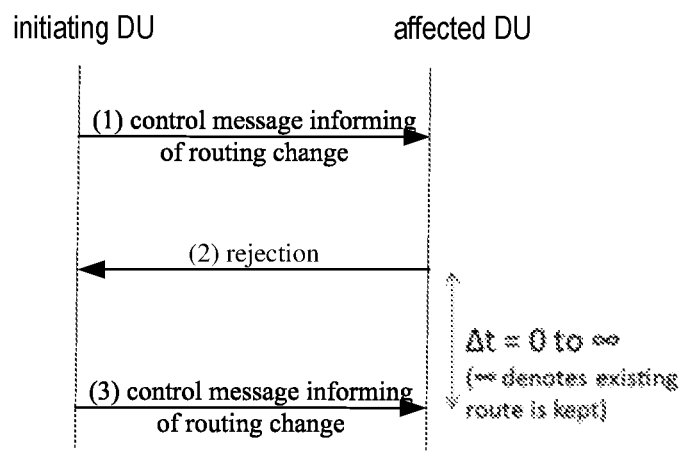

FIGS. 9A and 9B show message sequence diagrams depicting example transactions between a donor DU and a relay DU for changing routing paths (e.g., performing a routing function update). Because, in example embodiments, the RETR sublayer at each relay DU is responsible for performing a de-capsulation and re-encapsulation of PDCP PDUs based on routing information provided by the routing function (e.g., routing function 715), the network can dynamically change the routing path from CU to relay DUs to UE, depending up network condition (e.g., a network condition impacting the routing information), by propagating updates to the routing functions of affected DUs in the network. In example embodiments, the routing function updates can be provided on a per-route/bearer basis. In other example embodiments, the routing function updates may be provided on a per-DU/relay basis. In yet other example embodiments, the routing function updates can be provided on a per-UE basis.

As shown in FIGS. 9A and 9B, the routing function updates can be performed as part of a bi-directional procedure between the donor DU and the relay DU, initiated upon a change to the routing for one or more UEs or UE bearers. In example embodiments, as shown in FIG. 9A, the DU initiating the routing function change (initiating DU) can at transaction (1) send a control message(s) to the affected DU(s) informing it of a routing change. At transaction (2), the affected DU can send a confirmation to the initiating DU indicating successful reception of the control message. In response to receiving the confirmation from the affected DU(s), the initiating DU can perform the updated routing.

In other example embodiments, as shown in FIG. 9B, one or more of the affected DUs can reject the routing change after receiving the control message. At transaction (1) of FIG. 10B, the control message can be sent by the initiating DU. At transaction (2), the affected DU can respond to the control message by sending a rejection of the routing change, wherein the basis for rejection can be based on multiple potential criteria (e.g. traffic overload, inability to meet desired QoS criteria, radio link conditions, etc.). The affected DU can also inform the initiating DU of the basis for the rejection (for example, as part of the same transaction). In response, the initiating DU may keep the existing routing information, send yet another routing function update, or send the routing update control message again at transaction (3) after a set period Δt as shown in FIG. 9B. Or, in other embodiments, the initiating DU can sent the routing update control message again in response to receiving a notification from one or more DUs of a status change resulting in acceptability of the change in the routing information that enables the routing change to proceed.

Figure 10:
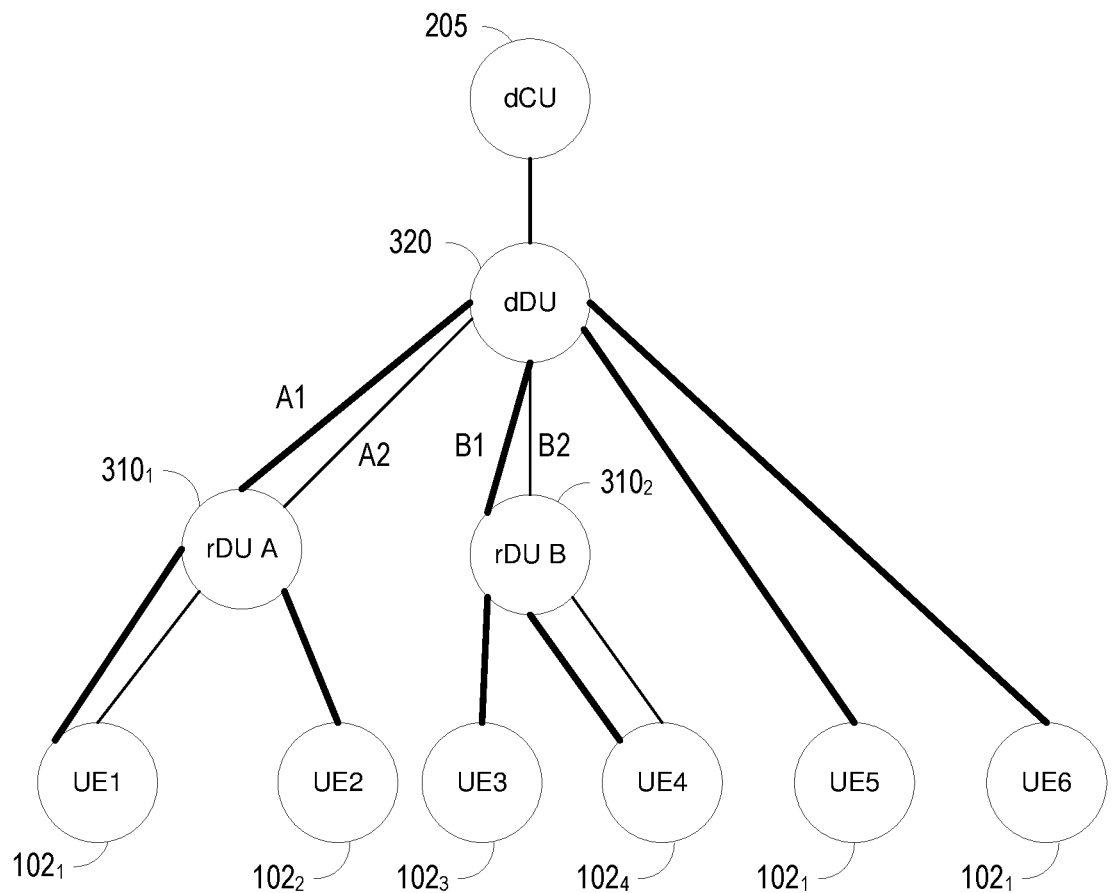
FIG. 10 illustrates a tree diagram depicting an example scenario of RETR functionality, in accordance with various aspects and embodiments of the subject disclosure.

FIG. 10 shows a topology diagram of a portion of an example network employing donor DUs and relay DUs. An illustration of the RETR sublayer functionality described so far for a specific scenario is shown in FIG. 6 as an example, where UE1 to UE4 (e.g., UE $102_1$ to UE $102_4$) are being served via relay DU A (rDU A) (e.g., relay DU $310_1$), and relay DUB (rDU B) (relay $310_2$), while UE5 (e.g., UE $102_5$) and UE6 (e.g., UE $102_6$) are directly being served by the donor DU (e.g., donor DU 320). Furthermore, this example assumes that UE1 and UE4 are both engaged in eMBB and low latency speech service sessions, so they each have two assigned bearers corresponding to 5QI value 8 (eMBB) and 5QI value 1 (low latency speech), which is shown in the diagram in FIG. 10 with lighter/thinner lines. In this scenario, the routing function at the donor DU would need to provide the type of association information shown in the example table of FIG. 11, to the corresponding PDU encapsulation and tunneling function 710 to indicate which UE bearers can be tunneled into which relay bearers. According to this example, the PDCP PDUs for the eMBB bearers of UE1 and UE2 being served by relay DU A are encapsulated in Relay Bearer A1 (e.g., can be multiplexed and carried on Relay Bearer A1), while the PDUs for the low latency speech bearer of UE1 must be encapsulated in a separate Relay Bearer A2 also going to relay DU A. A similar example is provided for relay DU B in the table.

The above bearer association table can be extended in case of multi-connectivity of relay DUs and/or access UEs. For example, in FIG. 10, UE2 might be connected to both relay DU A and relay DU B (e.g. via dual connectivity or if multi-TRP transmission is supported by the UE). In this case, depending on multiple factors such as traffic load, radio conditions, or UE mobility, the donor DU may encapsulate traffic for UE 2 in one or more (split) bearers across both rDU A and rDU B. Thus, the bearer association example in Table 1 may be extended to include multiple candidate relay DUs as next hops and multiple relay bearers for a given UE/UE Bearer. In another example, the bearer association given by Table 1 may be extended to include all remaining hops/relay bearers on the route between the donor/relay DU and the UE. This may be beneficial in the case of multi-hop routing to enable routing function updates considering the impact on the entire remaining routes and consider metrics such as traffic load, QoS, and radio link conditions across multiple relay links.

When the transmitting RETR sublayer at a DU performs encapsulation and tunneling, sufficient information can be encapsulated in the relay bearer PDUs to allow the receiving RETR sublayer at the receiving DU to de-capsulate the encapsulated PDCP PDUs from the UE bearers and forward them further to either correct RLC SAP for delivery to UE over air interface (Uu), or re-encapsulate into another relay bearer for delivery to another relay DU, for example based on routing information.

Figure 12:
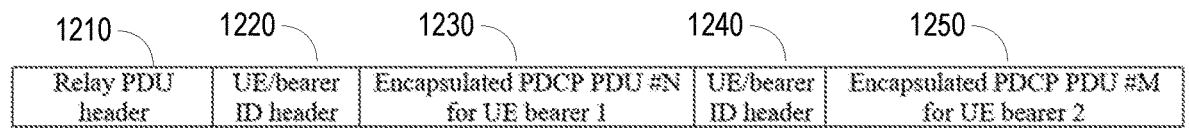
FIG. 12 illustrates an example frame structure configuration for a relay bearer data unit encapsulated with data units for UE bearers, in accordance with various aspects and embodiments of the subject disclosure.

One or many of the following pieces of information may be captured in the relay bearer PDU to accomplish the above. This list provides only some examples. Conceptually any information that facilitates successful de-capsulation and further forwarding at the receiving RETR sublayer can be included. For example, UE bearer identification information, UE identification information, and SAP identification information. The UE/bearer/SAP/etc. identification information can be captured in an ID header attached to the encapsulated PDCP PDU for each UE bearer. Additionally, the entire relay bearer PDU can employ a header as shown in FIG. 12, which depicts an example relay bearer PDU with encapsulated PDUs for UE bearers. The header shown in FIG. 12 comprises for example, a relay PDU header 1210, a UE/bearer ID header 1220, encapsulated PDCP PDU #N for UE bearer 1 1230, another UE/bearer ID header 1240, and encapsulated PDCP PDU #M for UE bearer 2 1250. It can be seen from this header that this relay bearer caries encapsulated PDU for UE1 as well as an encapsulated PDU for UE 2. As mentioned, the PDUs can be multiplexed onto a relay bearer channel.

In example embodiments, a relay device can take the form of a device (or one or more devices, which may be networked) that comprises a processor and a memory that stores executable instructions that, when executed by the processor, facilitate performance of operations, including those operations/methods as described below in FIGS. 13, 14, and 15.

Figure 13:
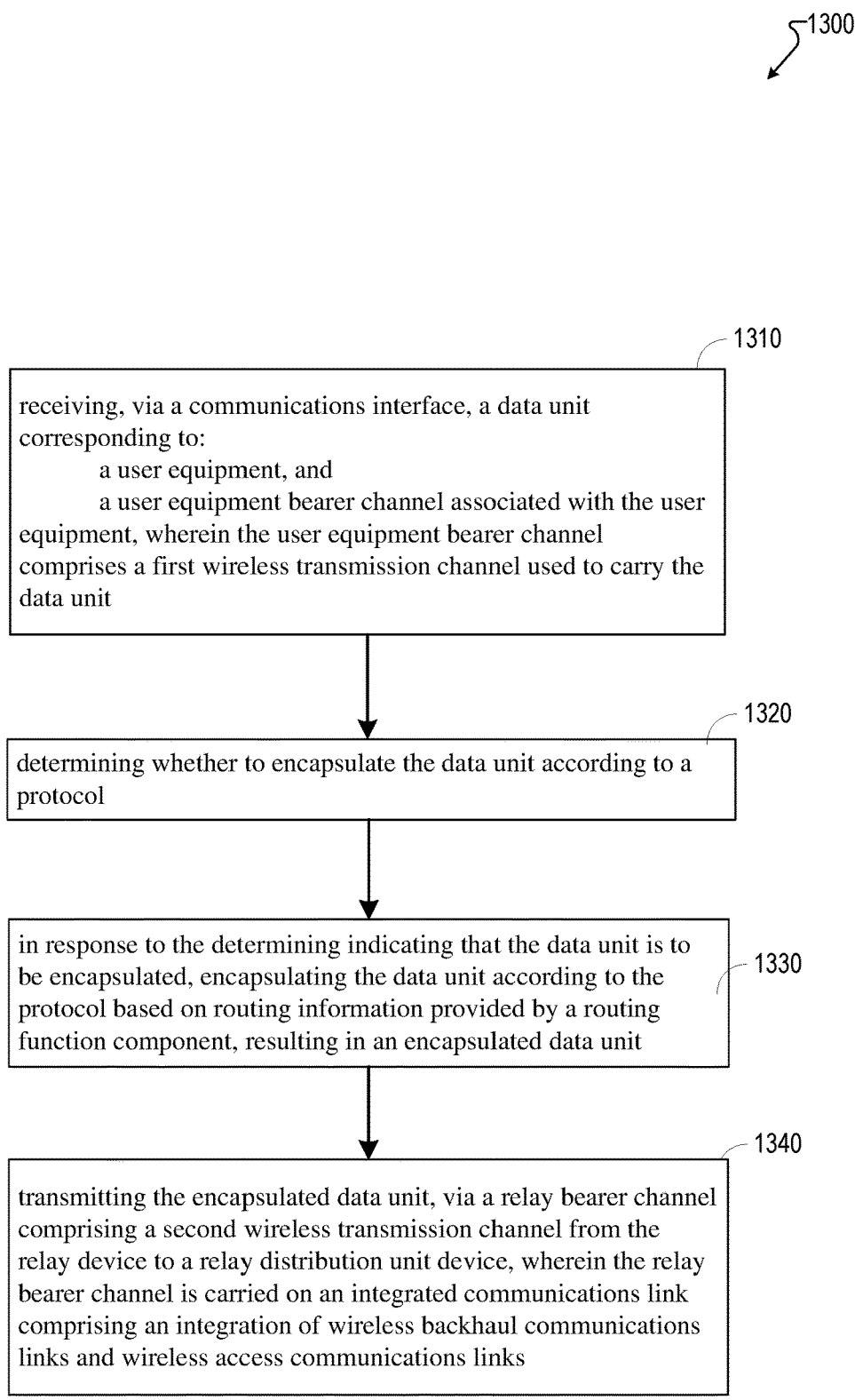
FIGS. 13, 14, and 15 illustrate example methods that can be performed employing the RETR protocol sublayer functionalities, in accordance with various aspects and embodiments of the subject disclosure.

FIG. 13 illustrates a flow diagram of operations that can be performed, for example, by a relay device (e.g., donor DU, relay DU), in accordance with example embodiments of the subject disclosure.

At block 1310, the operations can comprise receiving, via a communications interface (e.g., F1 interface 220), a data unit (e.g., PDCP PDU) corresponding to a user equipment (e.g., UE 102), and a user equipment bearer channel associated with the user equipment, wherein the user equipment bearer channel comprises a first wireless transmission channel used to carry the data unit.

At block 1320, the operations can comprise determining whether to encapsulate the data unit according to a protocol (e.g., the RETR sublayer 705).

At block 1330, the operations can comprise, in response to the determining indicating that the data unit is to be encapsulated, encapsulating the data unit according to the protocol based on routing information provided by a routing function component (e.g., routing function 715), resulting in an encapsulated data unit.

At block 1340, the operations can comprise transmitting the encapsulated data unit, via a relay bearer channel comprising a second wireless transmission channel from the relay device to a relay distribution unit device (e.g., relay DU 310), wherein the relay bearer channel is carried on an integrated communications link comprising an integration of wireless backhaul communications links and wireless access communications links (e.g., IAB link 615).

In example embodiments, the protocol defines a function that is applicable to a user plane for downlink transmission of first data and uplink transmission of second data via a network device of a wireless network.

The determining whether to encapsulate can be based on different criteria, including, but not limited to, a quality of service associated with the data unit (e.g., required quality of service (QoS) treatment), RLC mode (acknowledged mode (AM), unacknowledged mode (UM), and transparent mode (TM)), the number of hybrid automatic repeat request (HARQ) retransmissions, and other related parameters such as relay bearer initial block error rate (iBLER) target, etc.

The protocol is used by the relay device to incorporate information identifying the user equipment, the user equipment bearer channel, a quality of service associated with the user equipment bearer, and the relay bearer channel. The protocol can also be used by the relay device to provide information further identifying a downstream relay distribution unit device corresponding to a relay hop (see, e.g., FIG. 11).

The operations can further comprise performing a routing function update related to a network condition impacting the routing information (see, e.g., FIGS. 9A and 9B).

Figure 14:
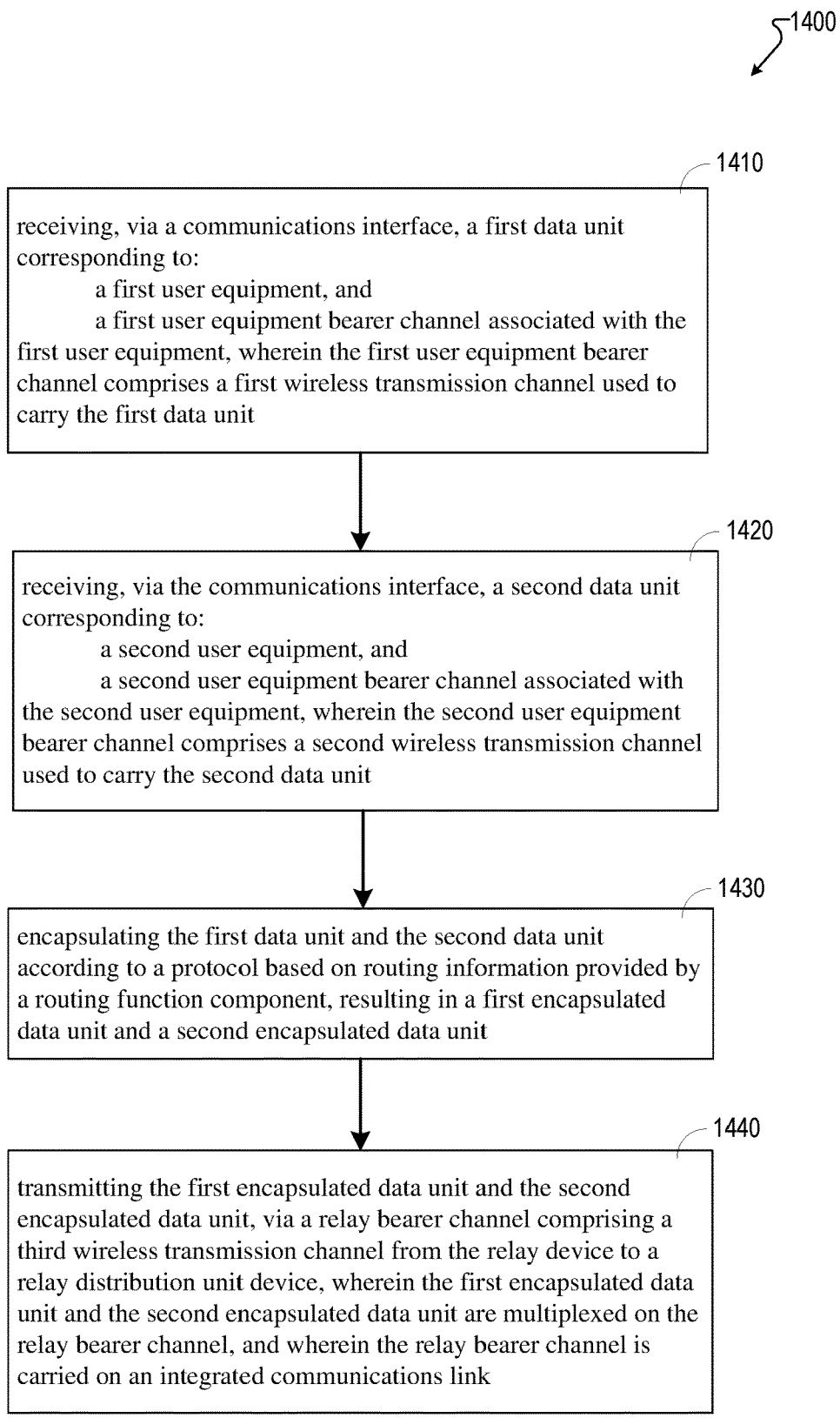

FIG. 14 illustrates another flow diagram of operations that can be performed, for example, by a relay device (e.g., donor DU, relay DU), in accordance with example embodiments of the subject disclosure. In this example, UE PDUs can be encapsulated and multiplexed onto a relay bearer channel, which is carried by an IAB link (e.g., IAB link 615).

At block 1410, the operations can comprise receiving, via a communications interface (e.g., F1 interface 220), a first data unit (e.g., PDU) corresponding to a first user equipment (e.g., UE 102₁), and a first user equipment bearer channel associated with the first user equipment, wherein the first user equipment bearer channel comprises a first wireless transmission channel used to carry the first data unit.

At block 1420, the operations can comprise receiving, via the communications interface, a second data unit corresponding to a second user equipment (e.g., UE 102₂), and a second user equipment bearer channel associated with the second user equipment, wherein the second user equipment bearer channel comprises a second wireless transmission channel used to carry the second data unit.

At block 1430, the operations can comprise encapsulating the first data unit and the second data unit according to a protocol (e.g., RETR sublayer 705). protocol) based on routing information provided by a routing function component (e.g., routing function 715), resulting in a first encapsulated data unit and a second encapsulated data unit.

At block 1440, the operations can comprise transmitting the first encapsulated data unit and the second encapsulated data unit, via a relay bearer channel comprising a third wireless transmission channel from the relay device to a relay distribution unit device (e.g., relay DU 310), wherein the first encapsulated data unit and the second encapsulated data unit are multiplexed on the relay bearer channel, and wherein the relay bearer channel is carried on an integrated communications link (e.g., IAB 615).

The protocol can define a function that is applicable to a user plane for downlink transmission of first data and uplink transmission of second data via a network device of a wireless network. The protocol can also be used by the relay device to incorporate information identifying, for example, the first user equipment, the first user equipment bearer channel, a quality of service associated with the first user equipment bearer, the second user equipment, the second user equipment bearer channel, a quality of service associated with the second user equipment bearer, and the relay bearer channel. The protocol can also be used by the relay device to provide information further identifying a downstream relay distribution unit device corresponding to a relay hop (see, e.g., FIG. 11).

Figure 15:
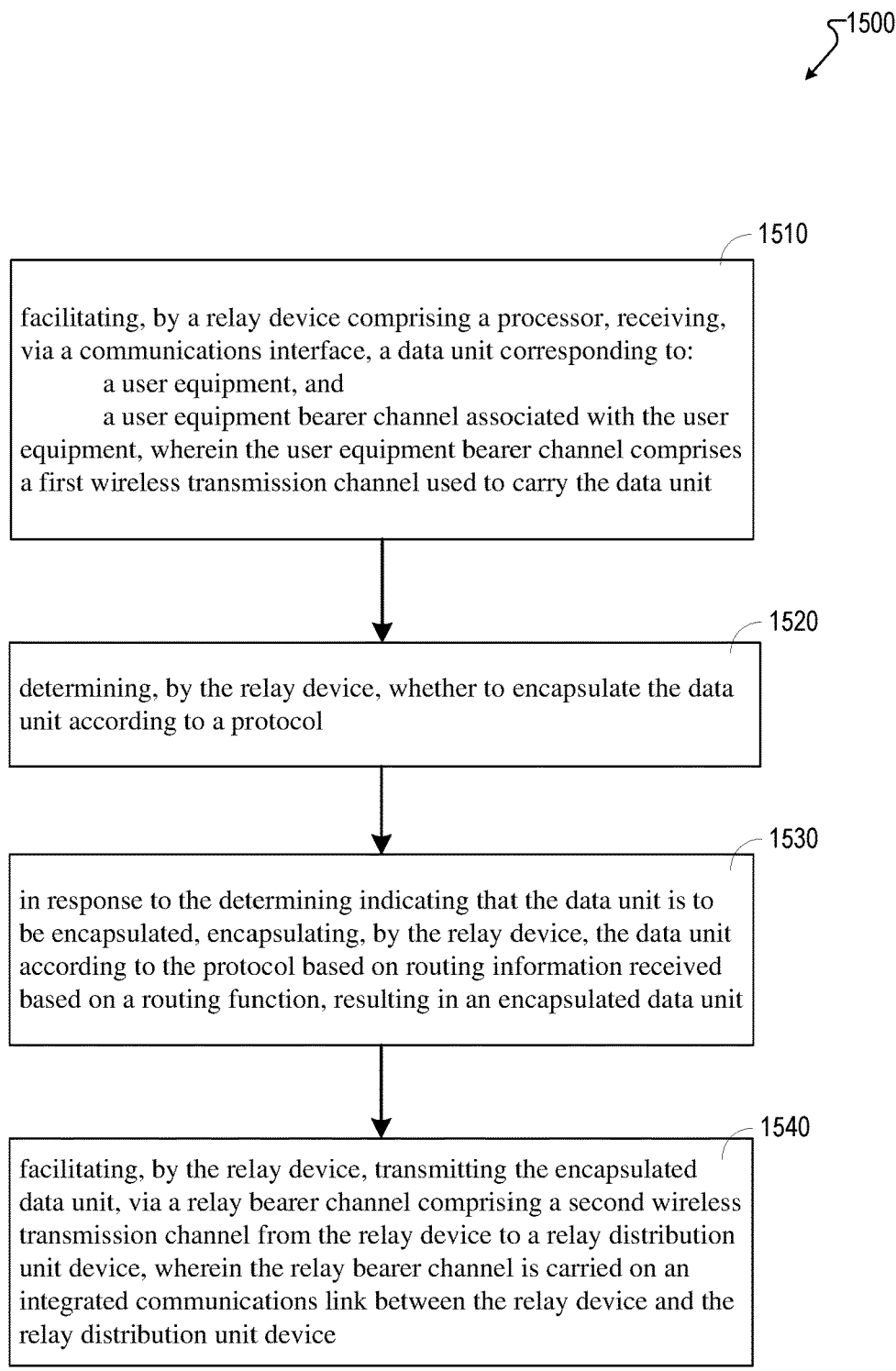

FIG. 15 illustrates another flow diagram of a method that can be performed, for example, by a relay device (e.g., donor DU, relay DU), in accordance with example embodiments of the subject disclosure. In this example, UE PDUs can be encapsulated and multiplexed onto a relay bearer channel, which is carried by an IAB link (e.g., IAB link 615).

At block 1510, the method can comprise facilitating, by a relay device (e.g., donor DU, relay DU), receiving, via a communications interface (e.g., F1 interface 220), a data unit (e.g., PDU) corresponding to a user equipment (e.g., UE 102), and a user equipment bearer channel associated with the user equipment, wherein the user equipment bearer channel comprises a first wireless transmission channel used to carry the data unit.

At block 1520, the method can comprise determining, by the relay device, whether to encapsulate the data unit according to a protocol (e.g., RETR sublayer 705).

At block 1530, the method can comprise, in response to the determining indicating that the data unit is to be encapsulated, encapsulating, by the relay device, the data unit according to the protocol based on routing information received based on a routing function (e.g., routing function 715), resulting in an encapsulated data unit.

At block 1540, the method can comprise facilitating, by the relay device, transmitting the encapsulated data unit, via a relay bearer channel comprising a second wireless transmission channel from the relay device to a relay distribution unit device (e.g., relay DU 310), wherein the relay bearer channel is carried on an integrated communications link (e.g., IAB 615) between the relay device and the relay distribution unit device.

The method of can further comprising performing, by the relay device, a routing function update related to a network condition impacting the routing information (see, e.g., FIGS. 9A and 9B and corresponding text).

The performing the routing function update further comprises transmitting a control message to the relay distribution unit device informing the relay distribution unit device of a change in the routing information, and performing an update to the routing information after receiving from the relay distribution unit device confirmation of reception of the control message by the relay distribution unit device.

The performing the routing function update can further comprises transmitting a control message to the relay distribution unit device informing the relay distribution unit device of a change in the routing information, and receiving a rejection of the change in the routing information and a basis for the rejection. The basis for the rejection can comprise, for example, a presence of a traffic overload condition, an inability to satisfy a quality of service criterion associated with the data unit, or a defined radio link condition. Based on the basis for the rejection, the routing information can be revised, resulting in revised routing information. The revised routing information can be transmitted to the relay distribution unit device (e.g., in a control message). In response to the rejection, the performance of the routing function update can comprise, after a time period has elapsed, facilitating re-transmitting the control message to the relay distribution unit device, wherein the control message informs the relay distribution unit device of the change in the routing information. After a rejection has been received, the performance of the routing function update can comprise receiving a notification from the relay distribution unit device indicative of a status change resulting in an acceptability of the change in the routing information, and performing an update to the routing information after receiving the notification from the relay distribution unit device resulting in an updated routing information.

Figure 16:
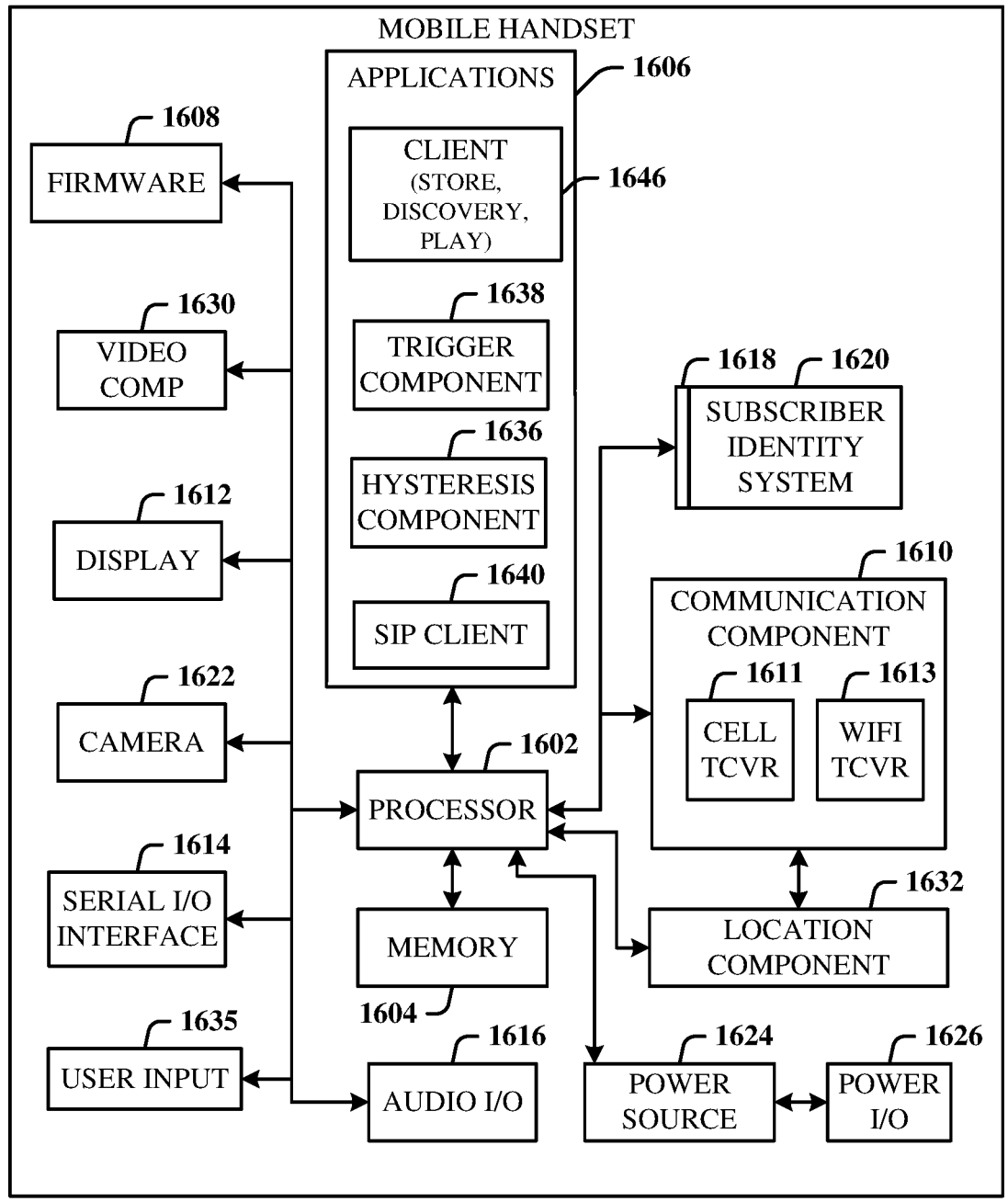
FIG. 16 illustrates an example block diagram of an example user equipment that can be a mobile handset, in accordance with various aspects and embodiments of the subject disclosure.

Referring now to FIG. 16, illustrated is a schematic block diagram of an example end-user device such as a user equipment (e.g., UE 102) that can be a mobile device 1600 capable of connecting to a network in accordance with some embodiments described herein. Although a mobile handset 1600 is illustrated herein, it will be understood that other devices can be a mobile device, and that the mobile handset 1600 is merely illustrated to provide context for the embodiments of the various embodiments described herein. The following discussion is intended to provide a brief, general description of an example of a suitable environment 1600 in which the various embodiments can be implemented. While the description comprises a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, comprising single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and comprises both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and that can be accessed by the computer.

Communication media typically embodies computer-readable instructions, data structures, program modules or other data in a modulated data signal such as a carrier wave or other transport mechanism, and comprises any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared and other wireless media. Combinations of the any of the above should also be included within the scope of computer-readable media.

The handset 1600 comprises a processor 1602 for controlling and processing all onboard operations and functions. A memory 1604 interfaces to the processor 1602 for storage of data and one or more applications 1606 (e.g., a video player software, user feedback component software, etc.). Other applications can include voice recognition of predetermined voice commands that facilitate initiation of the user feedback signals. The applications 1606 can be stored in the memory 1604 and/or in a firmware 1608, and executed by the processor 1602 from either or both the memory 1604 or/and the firmware 1608. The firmware 1608 can also store startup code for execution in initializing the handset 1600. A communications component 1610 interfaces to the processor 1602 to facilitate wired/wireless communication with external systems, e.g., cellular networks, VoIP networks, and so on. Here, the communications component 1610 can also include a suitable cellular transceiver 1611 (e.g., a GSM transceiver) and/or an unlicensed transceiver 1613 (e.g., Wi-Fi, WiMax) for corresponding signal communications. The handset 1600 can be a device such as a cellular telephone, a PDA with mobile communications capabilities, and messaging-centric devices. The communications component 1610 also facilitates communications reception from terrestrial radio networks (e.g., broadcast), digital satellite radio networks, and Internet-based radio services networks.

The handset 1600 comprises a display 1612 for displaying text, images, video, telephony functions (e.g., a Caller ID function), setup functions, and for user input. For example, the display 1612 can also be referred to as a "screen" that can accommodate the presentation of multimedia content (e.g., music metadata, messages, wallpaper, graphics, etc.). The display 1612 can also display videos and can facilitate the generation, editing and sharing of video quotes. A serial I/O interface 1614 is provided in communication with the processor 1602 to facilitate wired and/or wireless serial communications (e.g., USB, and/or IEEE 1394) through a hard-wire connection, and other serial input devices (e.g., a keyboard, keypad, and mouse). This supports updating and troubleshooting the handset 1600, for example. Audio capabilities are provided with an audio I/O component 1616, which can include a speaker for the output of audio signals related to, for example, indication that the user pressed the proper key or key combination to initiate the user feedback signal. The audio I/O component 1616 also facilitates the input of audio signals through a microphone to record data and/or telephony voice data, and for inputting voice signals for telephone conversations.

The handset 1600 can include a slot interface 1618 for accommodating a SIC (Subscriber Identity Component) in the form factor of a card Subscriber Identity Module (SIM) or universal SIM 1620, and interfacing the SIM card 1620 with the processor 1602. However, it is to be appreciated that the SIM card 1620 can be manufactured into the handset 1600, and updated by downloading data and software.

The handset 1600 can process IP data traffic through the communication component 1610 to accommodate IP traffic from an IP network such as, for example, the Internet, a corporate intranet, a home network, a person area network, etc., through an ISP or broadband cable provider. Thus, VoIP traffic can be utilized by the handset 1600 and IP-based multimedia content can be received in either an encoded or decoded format.

A video processing component 1622 (e.g., a camera) can be provided for decoding encoded multimedia content. The video processing component 1622 can aid in facilitating the generation, editing and sharing of video quotes. The handset 1600 also comprises a power source 1624 in the form of batteries and/or an AC power subsystem, which power source 1624 can interface to an external power system or charging equipment (not shown) by a power I/O component 1626.

The handset 1600 can also include a video component 1630 for processing video content received and, for recording and transmitting video content. For example, the video component 1630 can facilitate the generation, editing and sharing of video quotes. A location tracking component 1632 facilitates geographically locating the handset 1600. As described hereinabove, this can occur when the user initiates the feedback signal automatically or manually. A user input component 1634 facilitates the user initiating the quality feedback signal. The user input component 1634 can also facilitate the generation, editing and sharing of video quotes. The user input component 1634 can include such conventional input device technologies such as a keypad, keyboard, mouse, stylus pen, and/or touch screen, for example.

Referring again to the applications 1606, a hysteresis component 1636 facilitates the analysis and processing of hysteresis data, which is utilized to determine when to associate with the access point. A software trigger component 1638 can be provided that facilitates triggering of the hysteresis component 1638 when the Wi-Fi transceiver 1613 detects the beacon of the access point. A SIP client 1640 enables the handset 1600 to support SIP protocols and register the subscriber with the SIP registrar server. The applications 1606 can also include a client 1642 that provides at least the capability of discovery, play and store of multimedia content, for example, music.

The handset 1600, as indicated above related to the communications component 1610, comprises an indoor network radio transceiver 1613 (e.g., Wi-Fi transceiver). This function supports the indoor radio link, such as IEEE 802.11, for the dual-mode GSM handset 1600. The handset 1600 can accommodate at least satellite radio services through a handset that can combine wireless voice and digital radio chipsets into a single handheld device.

Figure 17:
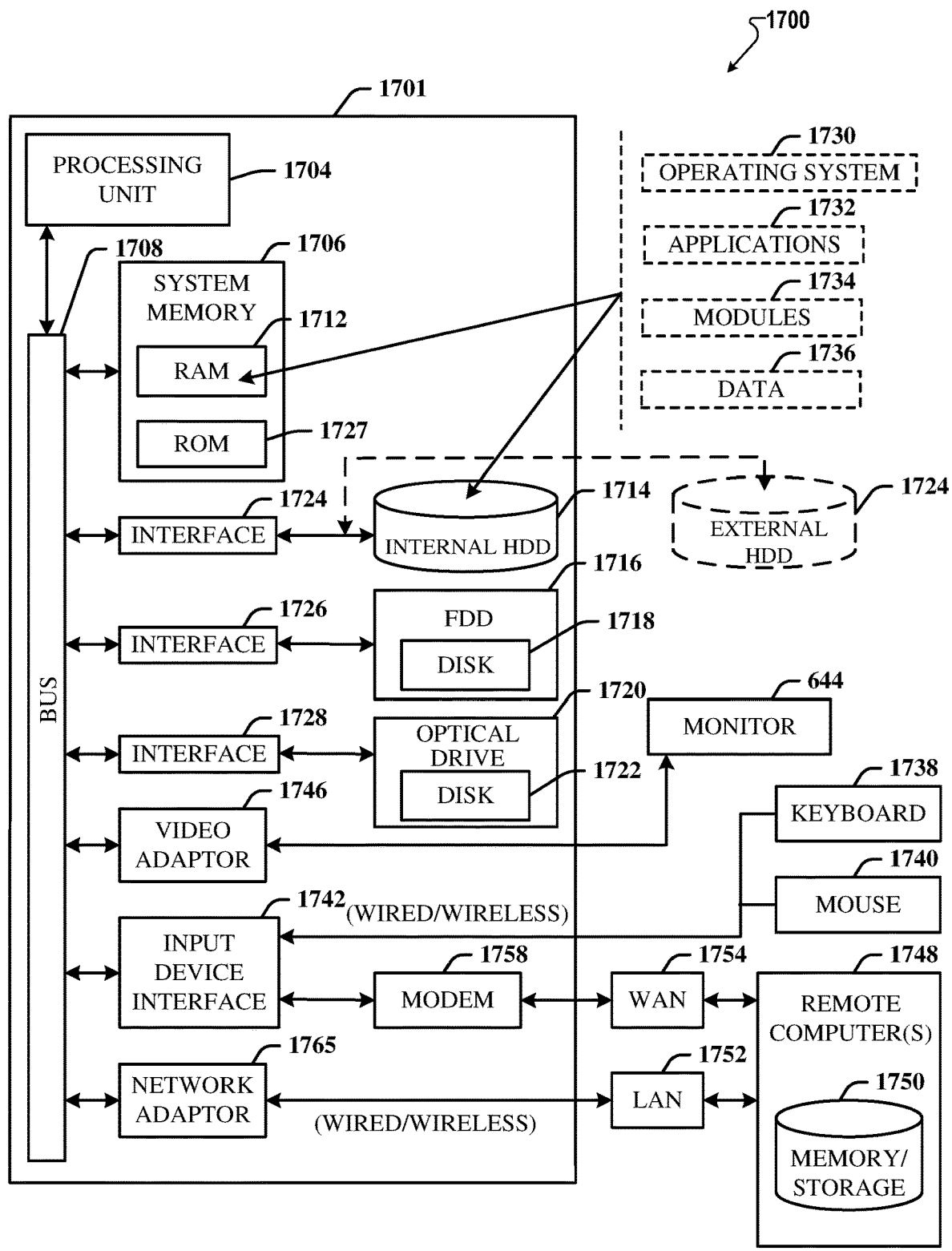
FIG. 17 illustrates an example block diagram of a computer that can be operable to execute processes and methods, in accordance with various aspects and embodiments of the subject disclosure.

Referring now to FIG. 17, there is illustrated a block diagram of a computer 1700 operable to execute the functions and operations performed in the described example embodiments. For example, relay devices can contain components as described in FIG. 17. The computer 1700 can provide networking and communication capabilities between a wired or wireless communication network and a server and/or communication device. In order to provide additional context for various aspects thereof, FIG. 17 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 17, implementing various aspects described herein, devices can include a computer 1700, the computer 1700 comprising a processing unit 1704, a system memory 1706 and a system bus 1708. The system bus 1708 couples system components comprising the system memory 1706 to the processing unit 1704. The processing unit 1704 can be any of various commercially available processors. Dual microprocessors and other multi-processor architectures can also be employed as the processing unit 1704.

The system bus 1708 can be any of several types of bus structure that can further interconnect to a memory bus (with or without a memory controller), a peripheral bus, and a local bus using any of a variety of commercially available bus architectures. The system memory 1706 comprises read-only memory (ROM) 1727 and random access memory (RAM) 1712. A basic input/output system (BIOS) is stored in a non-volatile memory 1727 such as ROM, EPROM, EEPROM, which BIOS contains the basic routines that help to transfer information between elements within the computer 1700, such as during start-up. The RAM 1712 can also include a high-speed RAM such as static RAM for caching data.

The computer 1700 further comprises an internal hard disk drive (HDD) 1714 (e.g., EIDE, SATA), which internal hard disk drive 1714 can also be configured for external use in a suitable chassis (not shown), a magnetic floppy disk drive (FDD) 1716, (e.g., to read from or write to a removable diskette 1718) and an optical disk drive 1720, (e.g., reading a CD-ROM disk 1722 or, to read from or write to other high capacity optical media such as the DVD). The hard disk drive 1714, magnetic disk drive 1716 and optical disk drive 1720 can be connected to the system bus 1708 by a hard disk drive interface 1724, a magnetic disk drive interface 1726 and an optical drive interface 1728, respectively. The interface 1724 for external drive implementations comprises at least one or both of Universal Serial Bus (USB) and IEEE 1294 interface technologies. Other external drive connection technologies are within contemplation of the subject embodiments.

The drives and their associated computer-readable media provide nonvolatile storage of data, data structures, computer-executable instructions, and so forth. For the computer 1700 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1700, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1712, comprising an operating system 1730, one or more application programs 1732, other program modules 1734 and program data 1736. All or portions of the operating system, applications, modules, and/or data can also be cached in the RAM 1712. It is to be appreciated that the embodiments can be implemented with various commercially available operating systems or combinations of operating systems.

A user can enter commands and information into the computer 1700 through one or more wired/wireless input devices, e.g., a keyboard 1738 and a pointing device, such as a mouse 1740. Other input devices (not shown) can include a microphone, an IR remote control, a joystick, a game pad, a stylus pen, touch screen, or the like. These and other input devices are often connected to the processing unit 1704 through an input device interface 1742 that is coupled to the system bus 1708, but can be connected by other interfaces, such as a parallel port, an IEEE 2394 serial port, a game port, a USB port, an IR interface, etc.

A monitor 1744 or other type of display device is also connected to the system bus 1708 through an interface, such as a video adapter 1746. In addition to the monitor 1744, a computer 1700 typically comprises other peripheral output devices (not shown), such as speakers, printers, etc.

The computer 1700 can operate in a networked environment using logical connections by wired and/or wireless communications to one or more remote computers, such as a remote computer(s) 1748. The remote computer(s) 1748 can be a workstation, a server computer, a router, a personal computer, portable computer, microprocessor-based entertainment device, a peer device or other common network node, and typically comprises many, if not all of, the elements described relative to the computer, although, for purposes of brevity, only a memory/storage device 1750 is illustrated. The logical connections depicted include wired/wireless connectivity to a local area network (LAN) 1752 and/or larger networks, e.g., a wide area network (WAN) 1754. Such LAN and WAN networking environments are commonplace in offices and companies, and facilitate enterprise-wide computer networks, such as intranets, all of which can connect to a global communications network, e.g., the Internet.

When used in a LAN networking environment, the computer 1700 is connected to the local network 1752 through a wired and/or wireless communication network interface or adapter 1756. The adapter 1756 can facilitate wired or wireless communication to the LAN 1752, which can also include a wireless access point disposed thereon for communicating with the wireless adapter 1756.

When used in a WAN networking environment, the computer 1700 can include a modem 1758, or is connected to a communications server on the WAN 1754, or has other means for establishing communications over the WAN 1754, such as by way of the Internet. The modem 1758, which can be internal or external and a wired or wireless device, is connected to the system bus 1708 through the input device interface 1742. In a networked environment, program modules depicted relative to the computer, or portions thereof, can be stored in the remote memory/storage device 1750. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station.

Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. These components also can execute from various computer readable storage media comprising various data structures stored thereon. The components can communicate via local and/or remote processes such as in accordance with a signal comprising one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of UE. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (comprising a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium comprising computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary," where used, is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature can be combined with one or more other features of the other implementations as may be desired and advantageous for any given or particular application. Furthermore, to the extent that the terms "have", "having", "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art can recognize that other embodiments comprising modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A relay device, comprising:
a processor; and
a memory that stores computer executable instructions that, when executed by the processor, facilitate performance of operations, comprising:
receiving a data unit corresponding to a user equipment bearer channel associated with a user equipment, wherein the user equipment bearer channel comprises a first wireless transmission channel used to carry the data unit,
in response to a determination that the data unit is to be encapsulated according to a protocol, encapsulating the data unit according to the protocol based on routing information received from a routing function, resulting in an encapsulated data unit, and
transmitting, to a relay distribution unit device, the encapsulated data unit via a relay bearer channel comprising a second wireless transmission channel, wherein the relay bearer channel is carried on a wireless integrated access and backhaul communication link.

2. The relay device of claim 1, wherein the protocol defines a function that is applicable to a user plane for downlink transmission of first data and uplink transmission of second data via network equipment.

3. The relay device of claim 1, wherein the determination that the data unit is to be encapsulated is based on a quality of service associated with the data unit.

4. The relay device of claim 1, wherein the protocol is used by the relay device to incorporate information identifying:
the user equipment,
the user equipment bearer channel,
a quality of service associated with the user equipment bearer channel, and the relay bearer channel.

5. The relay device of claim 4, wherein the information identifies a downstream relay distribution unit device corresponding to a relay hop.

6. The relay device of claim 1, wherein the operations further comprise:
performing a routing function update related to a network condition impacting the routing information.

7. A method, comprising:
facilitating, by a relay device comprising a processor, receiving a first data unit corresponding to a first user equipment bearer channel associated with a first user equipment, wherein the first user equipment bearer channel comprises a first wireless transmission channel used to carry the first data unit;
facilitating, by the relay device, receiving a second data unit corresponding to a second user equipment bearer channel associated with a second user equipment, wherein the second user equipment bearer channel comprises a second wireless transmission channel used to carry the second data unit;
facilitating, by the relay device, encapsulating the first data unit and the second data unit according to a protocol based on routing information received from a routing function, resulting in a first encapsulated data unit and a second encapsulated data unit; and
facilitating, by the relay device, transmitting the first encapsulated data unit and the second encapsulated data unit, via a relay bearer channel comprising a third wireless transmission channel from the relay device to a relay distribution unit device, wherein the first encapsulated data unit and the second encapsulated data unit are multiplexed on the relay bearer channel, and wherein the relay bearer channel is carried via an integrated access and backhaul communications link.

8. The method of claim 7, wherein the protocol defines a function that is applicable to a user plane for downlink transmission of first data and uplink transmission of second data via network equipment.

9. The method of claim 7, wherein the protocol is used by the relay device to incorporate information identifying:
the first user equipment,
the first user equipment bearer channel,
a quality of service associated with the first user equipment bearer channel,
the second user equipment,
the second user equipment bearer channel,
a quality of service associated with the second user equipment bearer channel, and
the relay bearer channel.

10. The method of claim 9, wherein the protocol is further used by the relay device to identify a downstream relay distribution unit device corresponding to a relay hop.

11. A non-transitory machine-readable medium, comprising executable instructions that, when executed by a relay device comprising a processor, facilitate performance of operations, comprising:
receiving a data unit corresponding to a user equipment bearer channel associated with a user equipment, wherein the user equipment bearer channel comprises a first transmission channel used to carry the data unit;
in response to determining that the data unit is to be encapsulated, encapsulating the data unit according to a protocol based on routing information received based on a routing function, resulting in an encapsulated data unit; and
transmitting the encapsulated data unit, via a relay bearer channel comprising a second transmission channel, to a relay distribution unit device, wherein the relay bearer channel is carried on an integrated access and backhaul communication link.

12. The non-transitory machine-readable medium claim 11, wherein the operations further comprise performing a routing function update related to a network condition impacting the routing information.

13. The non-transitory machine-readable medium of claim 12, wherein performing the routing function update further comprises:
transmitting a control message to the relay distribution unit device informing the relay distribution unit device of a change in the routing information; and
performing an update to the routing information after receiving, from the relay distribution unit device, confirmation of reception of the control message by the relay distribution unit device.

14. The non-transitory machine-readable medium of claim 12, wherein performing the routing function update further comprises:
transmitting a control message to the relay distribution unit device informing the relay distribution unit device of a change in the routing information; and
receiving a rejection of the change in the routing information and a basis for the rejection.

15. The non-transitory machine-readable medium of claim 14, wherein performing the routing function update further comprises:
based on the basis for the rejection, revising the routing information resulting in revised routing information, and transmitting the revised routing information to the relay distribution unit device.

16. The non-transitory machine-readable medium of claim 14, wherein performing the routing function update further comprises:
after a time period has elapsed, re-transmitting the control message to the relay distribution unit device, wherein the control message informs the relay distribution unit device of the change in the routing information.

17. The non-transitory machine-readable medium of claim 14, wherein performing the routing function update further comprises:
receiving a notification from the relay distribution unit device indicative of a status change resulting in an acceptability of the change in the routing information; and
performing an update to the routing information after receiving the notification from the relay distribution unit device resulting in updated routing information.

18. The non-transitory machine-readable medium of claim 14, wherein the basis for the rejection comprises a presence of a traffic overload condition.

19. The non-transitory machine-readable medium of claim 14, wherein the basis for the rejection comprises a presence of an inability to satisfy a quality of service criterion associated with the data unit.

20. The non-transitory machine-readable medium of claim 14, wherein the basis for the rejection comprises a presence of a defined radio link condition.

* * * * *